US010546214B2

(12) United States Patent
Guttmann

(10) Patent No.: US 10,546,214 B2
(45) Date of Patent: Jan. 28, 2020

(54) SYSTEM AND METHOD FOR COMMUNICATING VISUAL RECOGNITION

(71) Applicant: Allegro Artificial Intelligence LTD, Tel Aviv (IL)

(72) Inventor: Moshe Guttmann, Tel Aviv (IL)

(73) Assignee: ALLEGRO ARTIFICIAL INTELLIGENCE LTD, Tel Aviv (IL)

( * ) Notice: Subject to any disclaimer, the term of this patent is extended or adjusted under 35 U.S.C. 154(b) by 143 days.

(21) Appl. No.: 15/641,273

(22) Filed: Jul. 4, 2017

(65) Prior Publication Data

US 2019/0012570 A1 Jan. 10, 2019

Related U.S. Application Data

(60) Provisional application No. 62/358,451, filed on Jul. 5, 2016.

(51) Int. Cl.
| | |
|---|---|
| *G06K 9/62* | (2006.01) |
| *G06K 9/20* | (2006.01) |
| *G06K 9/00* | (2006.01) |
| *G06K 9/46* | (2006.01) |

(52) U.S. Cl.
CPC ....... *G06K 9/6215* (2013.01); *G06K 9/00624* (2013.01); *G06K 9/20* (2013.01); *G06K 9/46* (2013.01); *G06K 9/6201* (2013.01); *G06K 9/6267* (2013.01); *G06K 9/00221* (2013.01); *G06K 2009/00738* (2013.01)

(58) Field of Classification Search
CPC ..... G06K 2009/00738; G06K 9/00221; G06K 9/00624; G06K 9/20; G06K 9/46; G06K 9/6201; G06K 9/6215; G06K 9/6267
See application file for complete search history.

(56) References Cited

U.S. PATENT DOCUMENTS

| | | | |
|---|---|---|---|
| 2005/0162523 A1* | 7/2005 | Darrell ................. | G06F 16/951 348/211.2 |
| 2008/0209010 A1* | 8/2008 | Zitnick, III .......... | G06Q 10/107 709/219 |
| 2014/0112576 A1* | 4/2014 | Li ....................... | G06K 9/6256 382/159 |

* cited by examiner

*Primary Examiner* — Nirav G Patel
(74) *Attorney, Agent, or Firm* — Finnegan, Henderson, Farabow, Garrett & Dunner LLP

(57) ABSTRACT

System and method for visual recognition are provided. Image data may be captured. First descriptive information may be received, for example from an external device. The image data may be analyzed to identify a group of items matching the first descriptive information. In case the group of items comprises at least two items, a second descriptive information matching a subset of the identified group of items may be generated, and in some cases the second descriptive information may be provided to the external device. In case the group of items is a group of a single item, an association of the first descriptive information and an identification value may be stored in memory, and in some cases a corresponding indication may be provided to the external device. In case the group of items is an empty group, a corresponding indication may be provided to the external device.

23 Claims, 16 Drawing Sheets

SYSTEM AND METHOD FOR COMMUNICATING VISUAL RECOGNITION

CROSS REFERENCES TO RELATED APPLICATIONS

This application claims the benefit of priority of U.S. Provisional Patent Application No. 62/358,451, filed on Jul. 5, 2016, which is incorporated herein by reference in its entirety.

BACKGROUND

Technological Field

The disclosed embodiments generally relate to systems and methods for visual recognition. More particularly, the disclosed embodiments relate to systems and methods for communicating visual recognition.

Background Information

Image sensors are now part of numerous devices, from security systems to mobile phones, and the availability of images and videos produced by those devices is increasing.

Visual recognition of objects in different positions, orientations, distances, perspectives, illumination conditions, occlusions and background scenes may be challenging.

SUMMARY

In some embodiments, systems and methods for visual recognition are provided.

In some embodiments, image data may be obtained, for example by capturing the image data using an image sensor; a first descriptive information may be obtained, from example from an external device; and the image data may be analyzed to identify a group of items matching the first descriptive information. In some examples, based on a determination that the identified group of items comprises at least two items, a second descriptive information matching a first subset of the identified group of items may be generated; and the second descriptive information may be provided, for example to the external device. In some examples, based on a determination that the identified group of items is a group of a single item, a corresponding indication may be provided, for example to the external device. In some examples, based on a determination that the identified group of items is an empty group, a corresponding indication may be provided, for example to the external device.

In some embodiments, a proposed identification value associated with the first descriptive information may be obtained, for example by generating the proposed identification value and/or by receiving the proposed identification value from an external device. In some examples, the proposed identification value may be provided, for example to the external device. In some examples, an association of a proposed identification value and/or the first descriptive information and/or an external device may be stored in memory.

In some embodiments, spatial information may be obtained, for example from an external device; and the identification of the group of items may be based, at least in part, on the spatial information. In some examples, the spatial information may comprise information associated with a field of view of an image sensor used by the external device.

DESCRIPTION

Figure 1A:
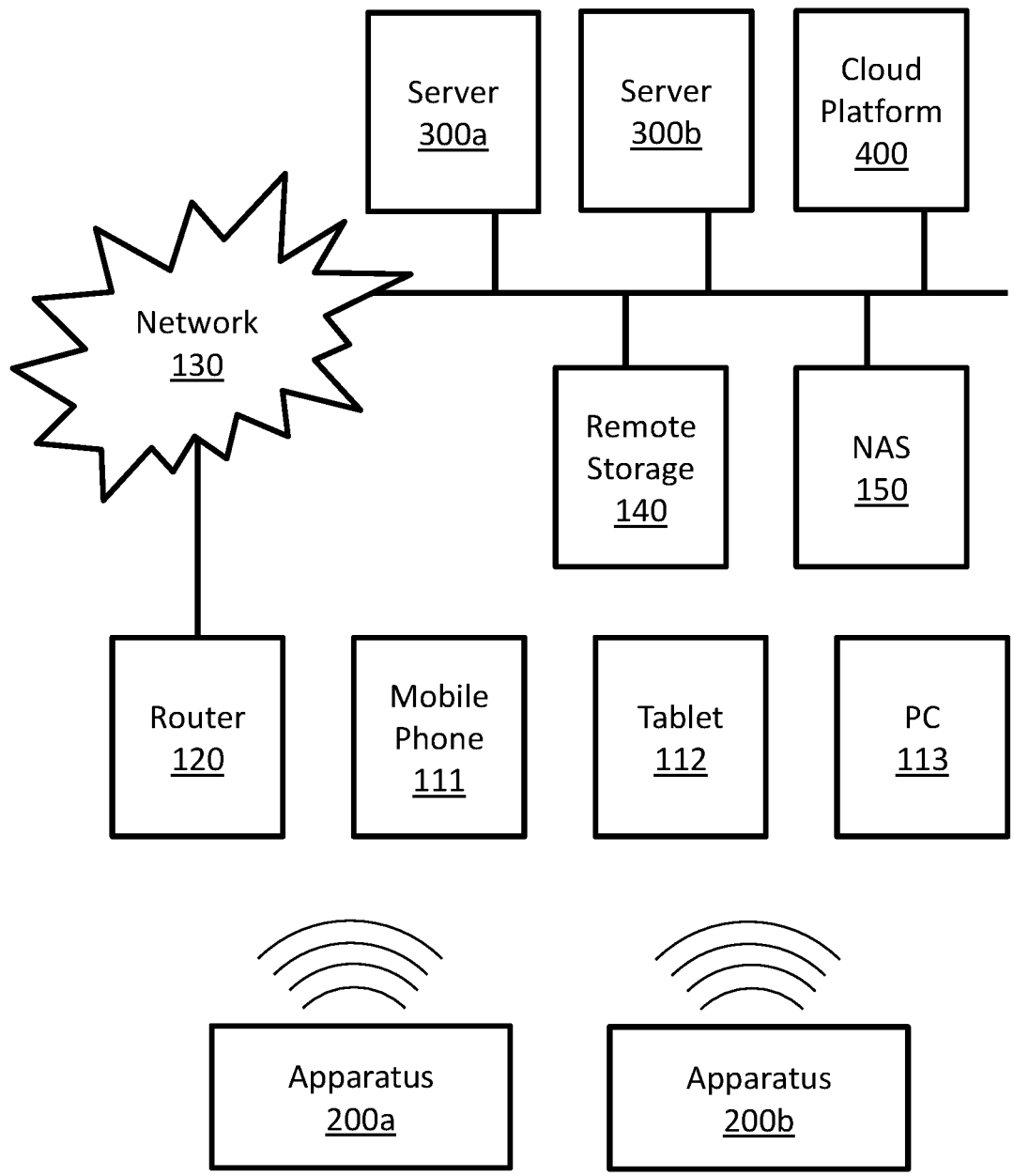
FIGS. 1A and 1B are block diagrams illustrating some possible implementations of a communicating system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

The term "audio sensor" is recognized by those skilled in the art and refers to any device configured to capture audio data. This includes sensors that convert audio and sounds into digital audio data.

The term "electrical impedance sensor" is recognized by those skilled in the art and refers to any sensor configured to measure the electrical connectivity and/or permittivity between two or more points. This include but not limited to: sensors configured to measuring changes in connectivity and/or permittivity over time; sensors configured to measure the connectivity and/or permittivity of biological tissues; sensors configured to measure the connectivity and/or permittivity of parts of body based, at least in part, on the connectivity and/or permittivity between surface electrodes; sensors configured to provide Electrical Impedance Tomography images, and so forth. Such sensors may include but not limited to: sensors that apply alternating currents at a single frequency; sensors that apply alternating currents at multiple frequencies; and so forth. Additionally, this may also include sensors that measure the electrical resistance between two or more points, which are sometimes referred to as ohmmeter.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways.

Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating a possible implementation of a communicating system. In this example, apparatuses 200a and 200b may communicate with server 300a, with server 300b, with cloud platform 400, with each other, and so forth. Possible implementations of apparatuses 200a and 200b may include apparatus 200 as described in FIGS. 2A and 2B. Possible implementations of servers 300a and 300b may include server 300 as described in FIG. 3. Some possible implementations of cloud platform 400 are described in FIGS. 4A, 4B and 5. In this example apparatuses 200a and 200b may communicate directly with mobile phone 111, tablet 112, and personal computer (PC) 113. Apparatuses 200a and 200b may communicate with local router 120 directly, and/or through at least one of mobile phone 111, tablet 112, and personal computer (PC) 113. In this example, local router 120 may be connected with a communication network 130. Examples of communication network 130 may include the Internet, phone networks, cellular networks, satellite communication networks, private communication networks, virtual private networks (VPN), and so forth. Apparatuses 200a and 200b may connect to communication network 130 through local router 120 and/or directly. Apparatuses 200a and 200b may communicate with other devices, such as servers 300a, server 300b, cloud platform 400, remote storage 140 and network attached storage (NAS) 150, through communication network 130 and/or directly.

Figure 1B:
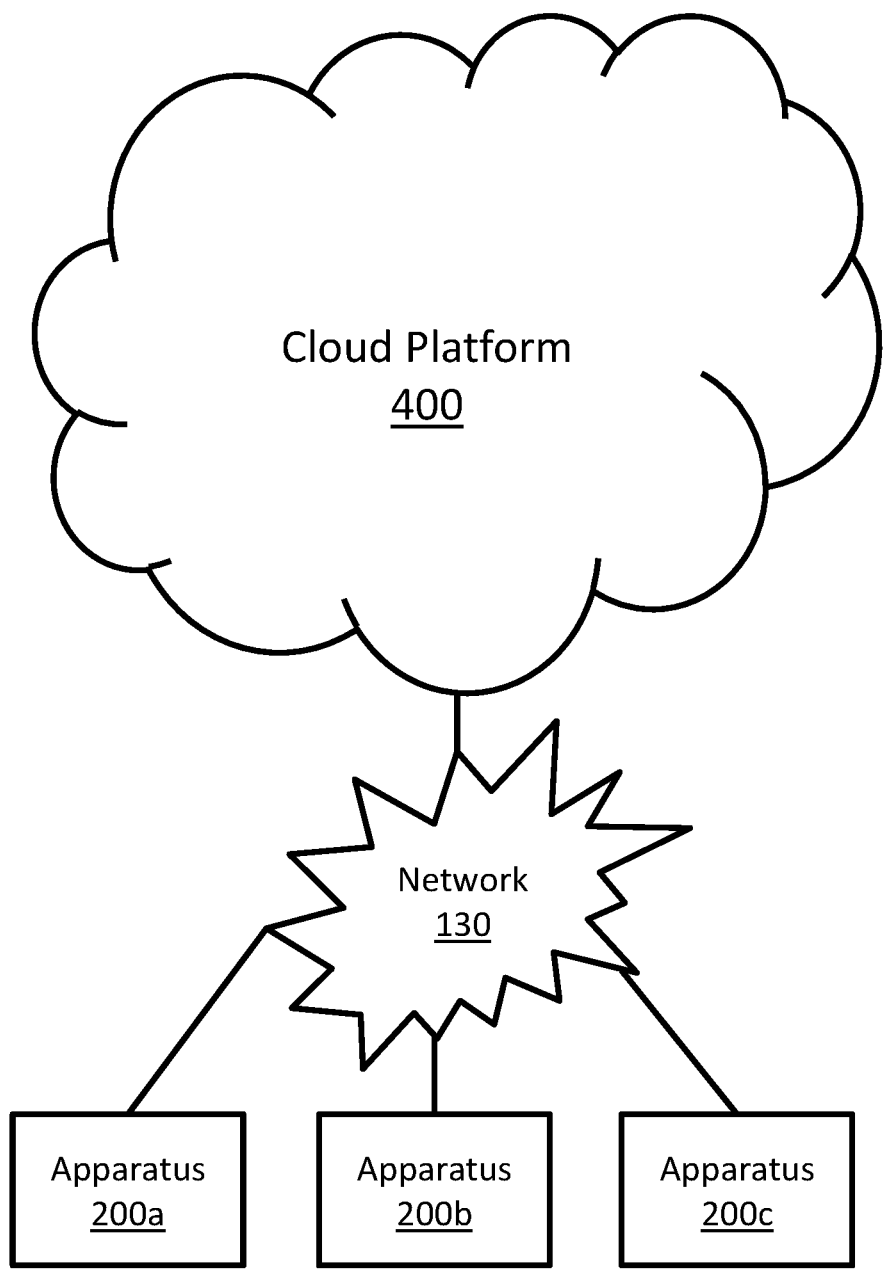

FIG. 1B is a block diagram illustrating a possible implementation of a communicating system. In this example, apparatuses 200a, 200b and 200c may communicate with cloud platform 400 and/or with each other through communication network 130. Possible implementations of apparatuses 200a, 200b and 200c may include apparatus 200 as described in FIGS. 2A and 2B. Some possible implementations of cloud platform 400 are described in FIGS. 4A, 4B and 5.

FIGS. 1A and 1B illustrate some possible implementations of a communication system. In some embodiments, other communication systems that enable communication between apparatus 200 and server 300 may be used. In some embodiments, other communication systems that enable communication between apparatus 200 and cloud platform 400 may be used. In some embodiments, other communication systems that enable communication among a plurality of apparatuses 200 may be used.

Figure 2A:
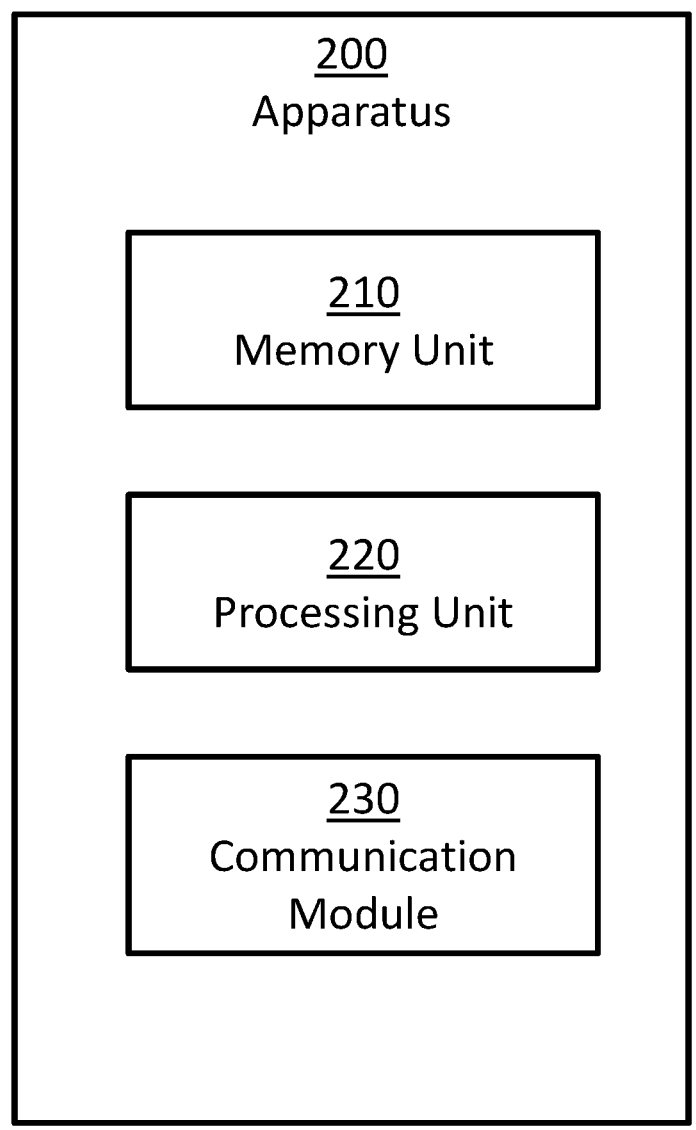
FIGS. 2A and 2B are block diagrams illustrating some possible implementations of an apparatus.

FIG. 2A is a block diagram illustrating a possible implementation of apparatus 200. In this example, apparatus 200 may comprise: one or more memory units 210, one or more processing units 220, and one or more communication modules 230. In some implementations, apparatus 200 may comprise additional components, while some components listed above may be excluded.

Figure 2B:
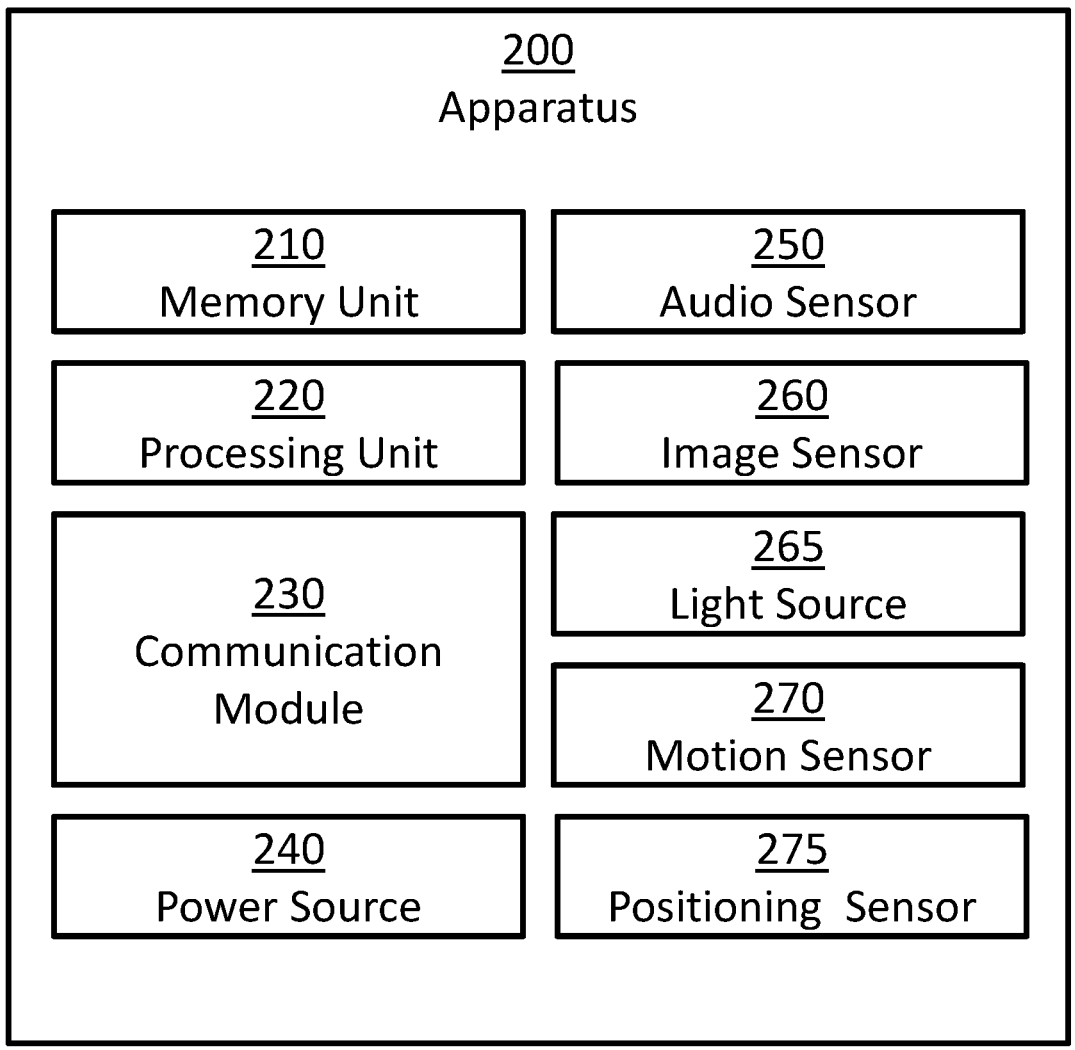

FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more pressure sensors; one or more proximity sensors; one or more electrical impedance sensors; one or more electrical voltage sensors; one or more electrical current sensors; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275.

In some embodiments, one or more power sources 240 may be configured to: power apparatus 200; power server 300; power cloud platform 400; and/or power computational node 500. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; pressure sensors; proximity sensors; electrical impedance sensors; electrical voltage sensors; electrical current sensors; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices, such as server 300, cloud platform 400, computational node 500, and so forth. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; and so forth. In some examples, the captured visual information may be stored in memory units 210. In some additional examples, the captured visual information may be transmitted using communication modules 230, for example to other computerized devices, such as server 300, cloud platform 400, computational node 500, and so forth. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more pressure sensors may be configured to perform at least one of the following: detect pressure in the environment of apparatus 200; measure pressure in the environment of apparatus 200; detect change in the pressure in the environment of apparatus 200; measure change in pressure in the environment of apparatus 200; detect pressure at a specific point and/or region of the surface area of apparatus 200; measure pressure at a specific point and/or region of the surface area of apparatus 200; detect change in pressure at a specific point and/or area; measure change in pressure at a specific point and/or region of the surface area of apparatus 200; measure the pressure differences between two specific points and/or regions of the surface area of apparatus 200; measure changes in relative pressure between two specific points and/or regions of the surface area of apparatus 200. In some examples, information captured using the pressure sensors may be stored in memory units 210, may be processed by processing units 220, may be transmitted and/or received using communication modules 230, and so forth.

In some embodiments, the one or more proximity sensors may be configured to perform at least one of the following: detect contact of a solid object with the surface of apparatus 200; detect contact of a solid object with a specific point and/or region of the surface area of apparatus 200; detect a proximity of apparatus 200 to an object. In some implementations, proximity sensors may be implemented using image sensors 260 and light sources 265, for example by emitting light using light sources 265, such as ultraviolet light, visible light, infrared light and/or microwave light, and detecting the light reflected from nearby objects using image sensors 260 to detect the present of nearby objects. In some examples, information captured using the proximity sensors may be stored in memory units 210, may be processed by processing units 220, may be transmitted and/or received using communication modules 230, and so forth.

In some embodiments, the one or more electrical impedance sensors may be configured to perform at least one of the following: detect change over time in the connectivity and/or permittivity between two electrodes; measure changes over time in the connectivity and/or permittivity between two electrodes; capture Electrical Impedance Tomography (EIT) images. In some examples, information captured using the electrical impedance sensors may be stored in memory units 210, may be processed by processing units 220, may be transmitted and/or received using communication modules 230, and so forth.

In some embodiments, the one or more electrical voltage sensors may be configured to perform at least one of the following: detect and/or measure voltage between two electrodes; detect and/or measure changes over time in the voltage between two electrodes. In some examples, information captured using the electrical voltage sensors may be stored in memory units 210, may be processed by processing units 220, may be transmitted and/or received using communication modules 230, and so forth.

In some embodiments, the one or more electrical current sensors may be configured to perform at least one of the following: detect and/or measure electrical current flowing between two electrodes; detect and/or measure changes over time in the electrical current flowing between two electrodes. In some examples, information captured using the electrical current sensors may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
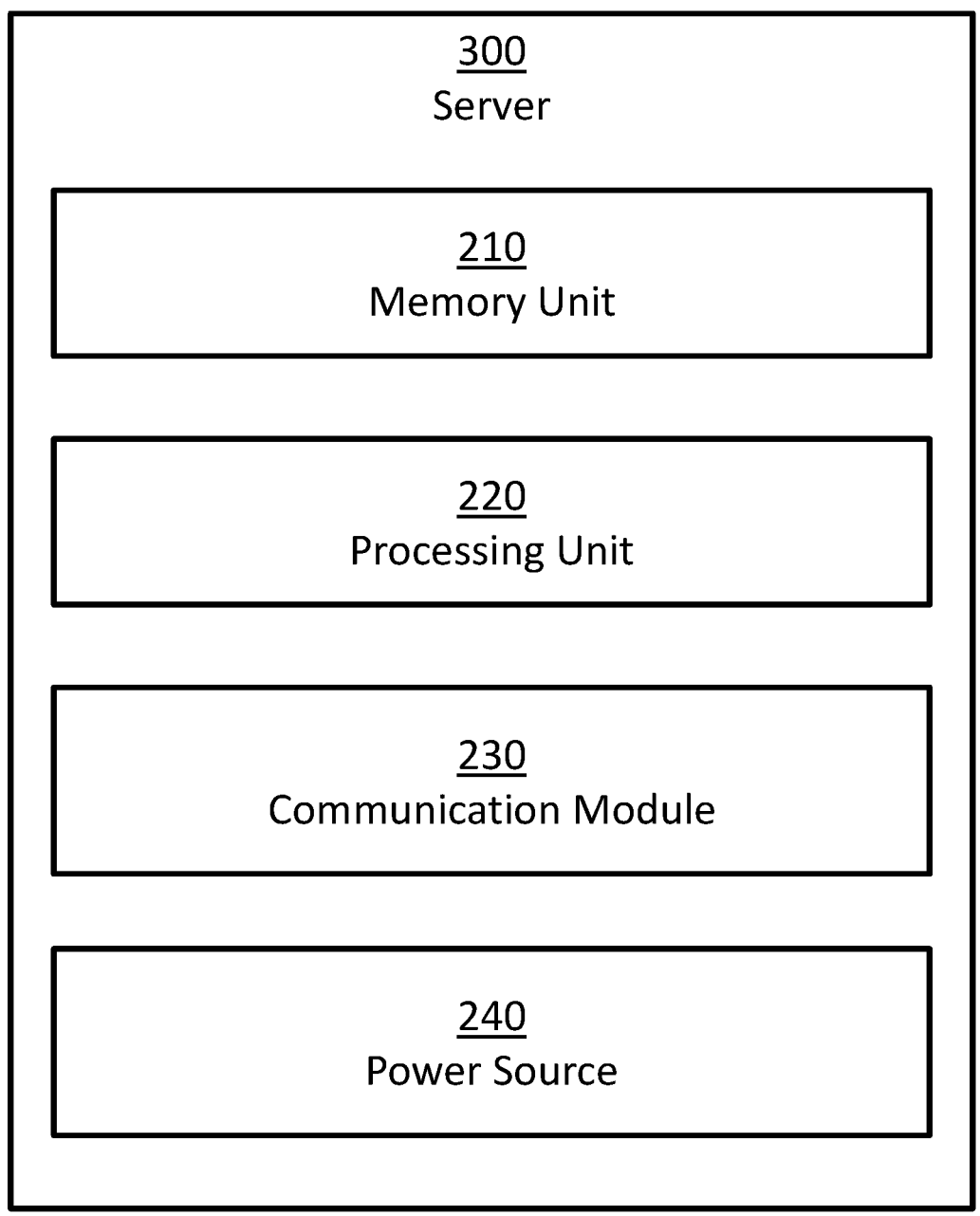
FIG. 3 is a block diagram illustrating a possible implementation of a server.

FIG. 3 is a block diagram illustrating a possible implementation of server 300. In this example, server 300 may comprise: one or more memory units 210, one or more processing units 220, one or more communication modules 230, and one or more power sources 240. In some implementations, server 300 may comprise additional components, while some components listed above may be excluded. For example, in some implementations server 300 may also comprise at least one of the following: one or more user input devices; one or more output devices; and so forth. In another example, in some implementations at least one of the following may be excluded from server 300: memory units 210, communication modules 230, and power sources 240.

Figure 4A:
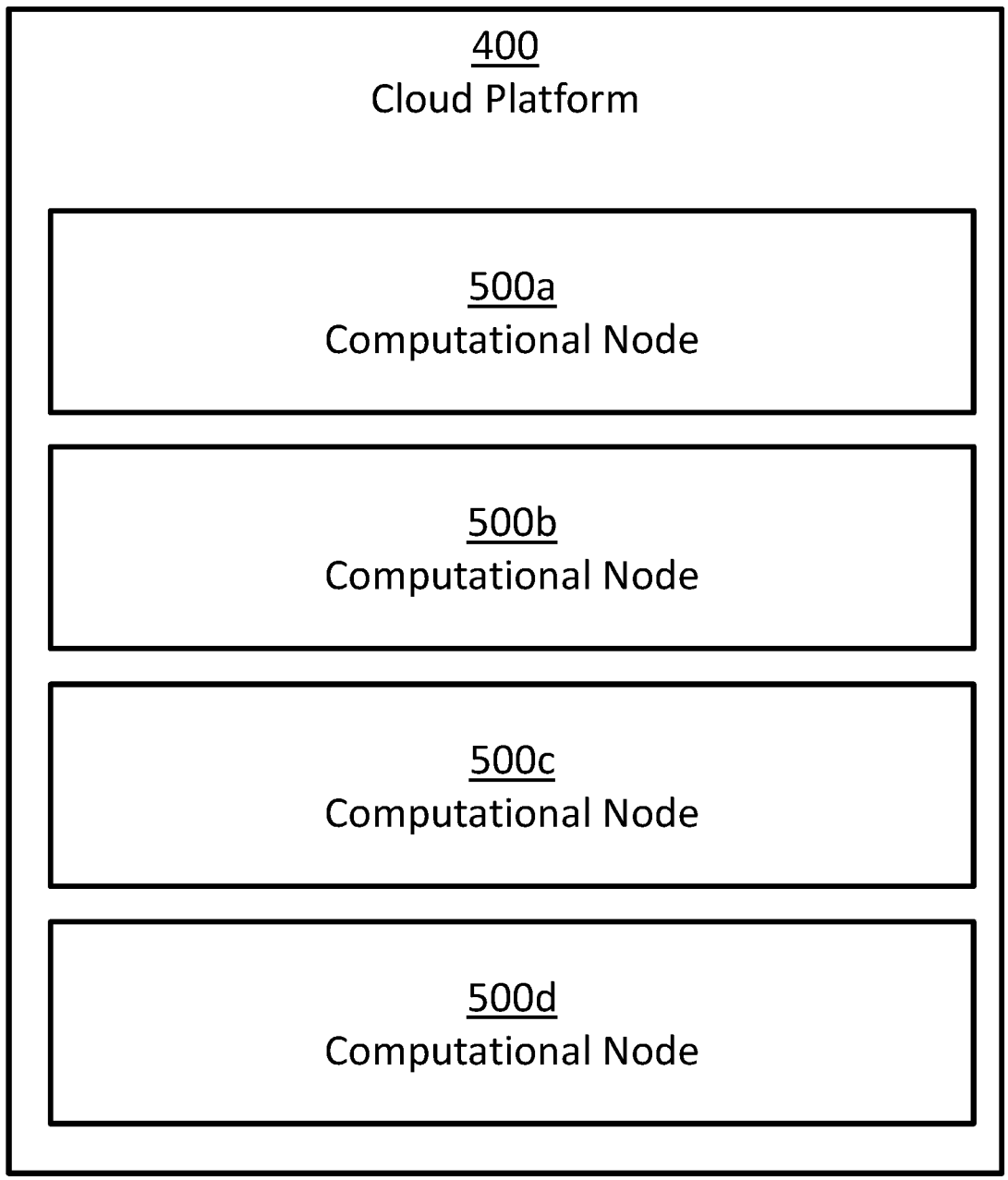
FIGS. 4A and 4B are block diagrams illustrating some possible implementations of a cloud platform.

FIG. 4A is a block diagram illustrating a possible implementation of cloud platform 400. In this example, cloud platform 400 may comprise computational node 500a, computational node 500b, computational node 500c and computational node 500d. In some examples, a possible implementation of computational nodes 500a, 500b, 500c and 500d may comprise server 300 as described in FIG. 3. In some examples, a possible implementation of computational nodes 500a, 500b, 500c and 500d may comprise computational node 500 as described in FIG. 5.

Figure 4B:
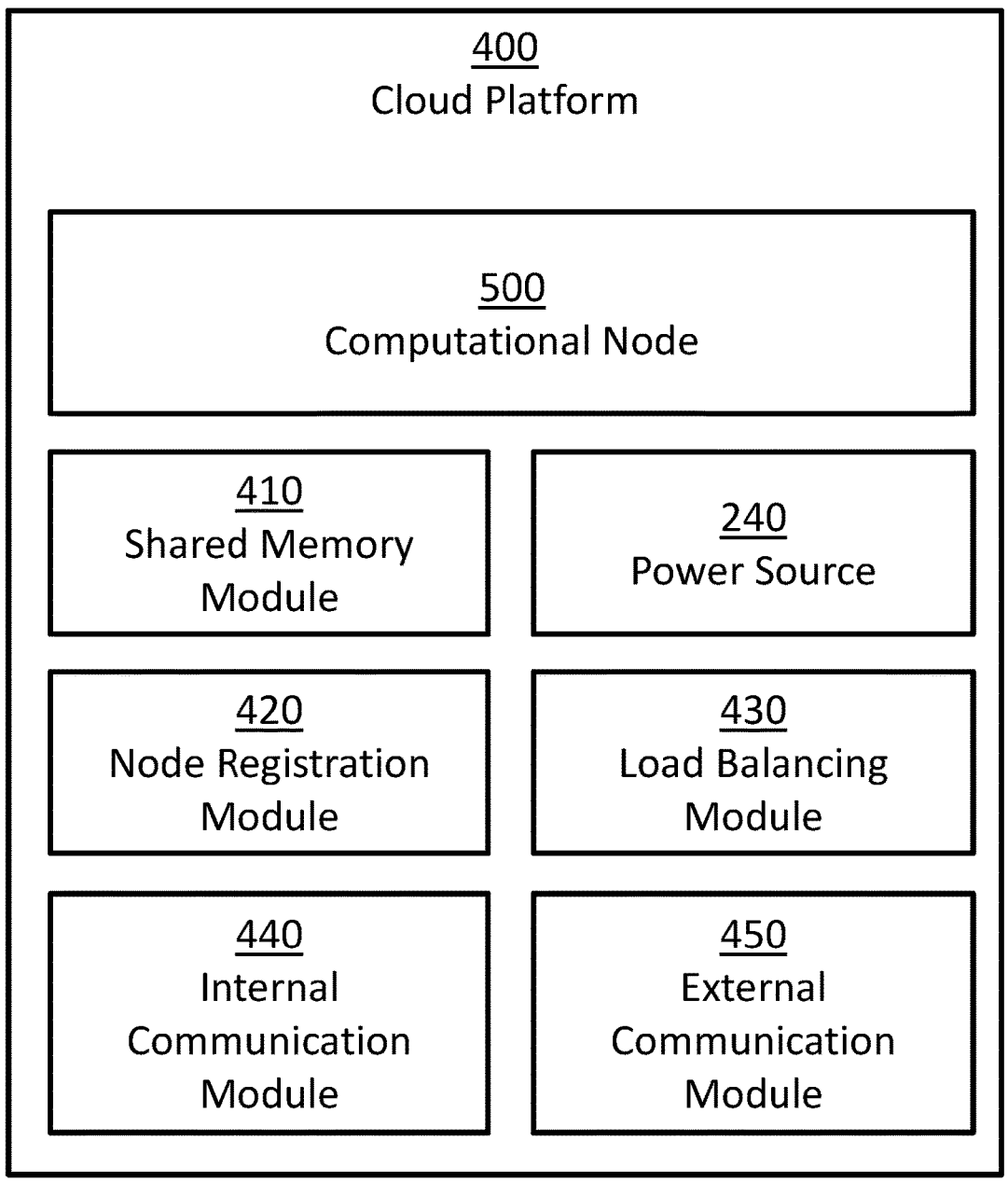

FIG. 4B is a block diagram illustrating a possible implementation of cloud platform 400. In this example, cloud platform 400 may comprise: one or more computational nodes 500, one or more shared memory modules 410, one or more power sources 240, one or more node registration modules 420, one or more load balancing modules 430, one or more internal communication modules 440, and one or more external communication modules 450. In some implementations, cloud platform 400 may comprise additional components, while some components listed above may be excluded. For example, in some implementations cloud platform 400 may also comprise at least one of the following: one or more user input devices; one or more output devices; and so forth. In another example, in some implementations at least one of the following may be excluded from cloud platform 400: shared memory modules 410, power sources 240, node registration modules 420, load balancing modules 430, internal communication modules 440, and external communication modules 450.

Figure 5:
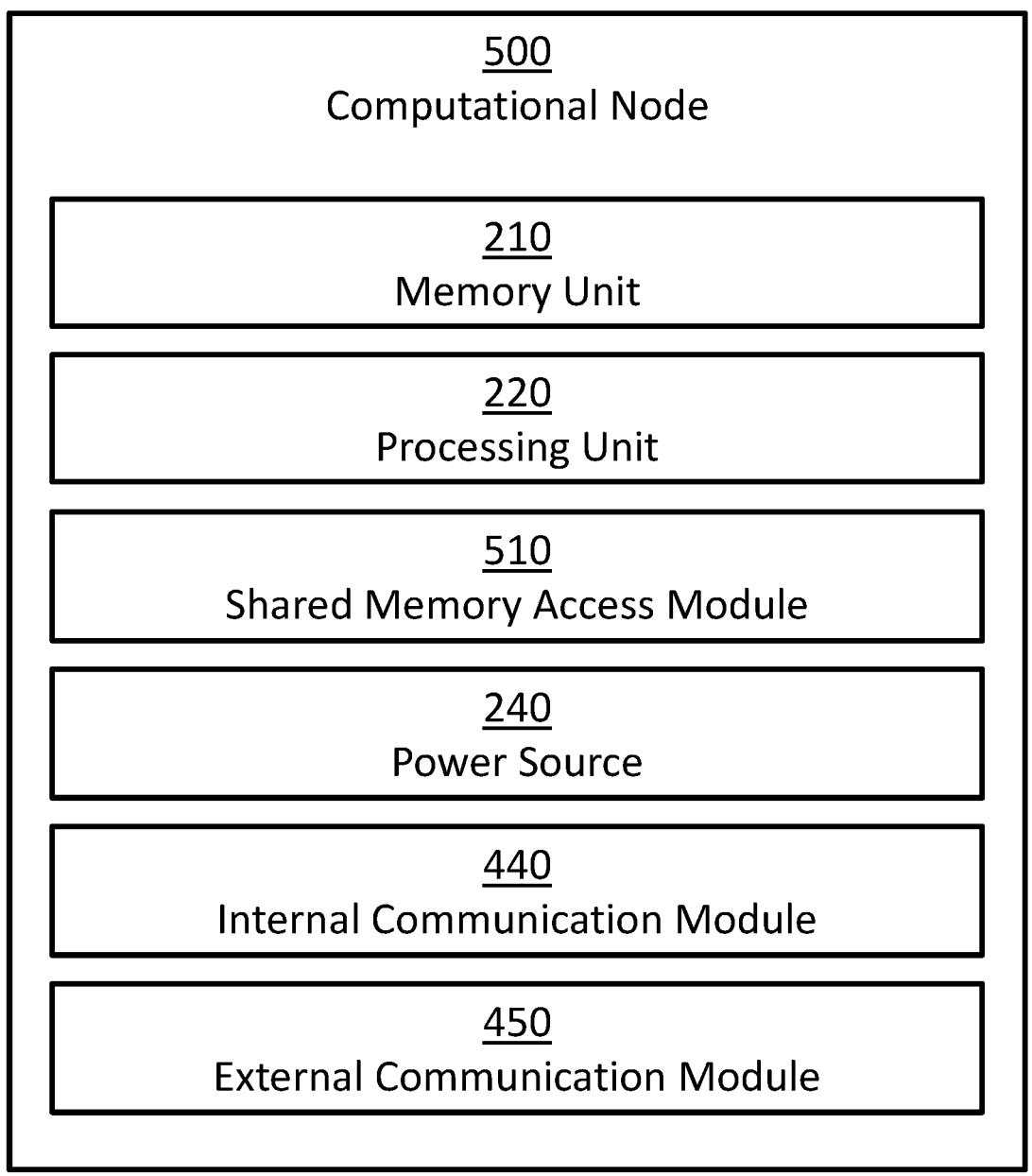
FIG. 5 is a block diagram illustrating a possible implementation of a computational node.

FIG. 5 is a block diagram illustrating a possible implementation of computational node 500. In this example, computational node 500 may comprise: one or more memory units 210, one or more processing units 220, one or more shared memory access modules 510, one or more power sources 240, one or more internal communication modules 440, and one or more external communication modules 450. In some implementations, computational node 500 may comprise additional components, while some components listed above may be excluded. For example, in some implementations computational node 500 may also comprise at least one of the following: one or more user input devices; one or more output devices; and so forth. In another example, in some implementations at least one of the following may be excluded from computational node 500: memory units 210, shared memory access modules 510, power sources 240, internal communication modules 440, and external communication modules 450.

In some embodiments, internal communication modules 440 and external communication modules 450 may be implemented as a combined communication module, such as communication modules 230. In some embodiments, one possible implementation of cloud platform 400 may comprise server 300. In some embodiments, one possible implementation of computational node 500 may comprise server 300. In some embodiments, one possible implementation of shared memory access modules 510 may comprise using internal communication modules 440 to send information to shared memory modules 410 and/or receive information from shared memory modules 410. In some embodiments, node registration modules 420 and load balancing modules 430 may be implemented as a combined module.

In some embodiments, the one or more shared memory modules 410 may be accessed by more than one computational node. Therefore, shared memory modules 410 may allow information sharing among two or more computational nodes 500. In some embodiments, the one or more shared memory access modules 510 may be configured to enable access of computational nodes 500 and/or the one or more processing units 220 of computational nodes 500 to shared memory modules 410. In some examples, computational nodes 500 and/or the one or more processing units 220 of computational nodes 500, may access shared memory modules 410, for example using shared memory access modules 510, in order to perform at least one of: executing software programs stored on shared memory modules 410, store information in shared memory modules 410, retrieve information from the shared memory modules 410.

In some embodiments, the one or more node registration modules 420 may be configured to track the availability of the computational nodes 500. In some examples, node registration modules 420 may be implemented as: a software program, such as a software program executed by one or more of the computational nodes 500; a hardware solution; a combined software and hardware solution; and so forth. In some implementations, node registration modules 420 may communicate with computational nodes 500, for example using internal communication modules 440. In some examples, computational nodes 500 may notify node registration modules 420 of their status, for example by sending messages: at computational node 500 startup; at computational node 500 shutdown; at constant intervals; at selected times; in response to queries received from node registration modules 420; and so forth. In some examples, node registration modules 420 may query about computational nodes 500 status, for example by sending messages: at node registration module 420 startup; at constant intervals; at selected times; and so forth.

In some embodiments, the one or more load balancing modules 430 may be configured to divide the work load among computational nodes 500. In some examples, load balancing modules 430 may be implemented as: a software program, such as a software program executed by one or more of the computational nodes 500; a hardware solution; a combined software and hardware solution; and so forth. In some implementations, load balancing modules 430 may interact with node registration modules 420 in order to obtain information regarding the availability of the computational nodes 500. In some implementations, load balancing modules 430 may communicate with computational nodes 500, for example using internal communication modules 440. In some examples, computational nodes 500 may notify load balancing modules 430 of their status, for example by sending messages: at computational node 500 startup; at computational node 500 shutdown; at constant intervals; at selected times; in response to queries received from load balancing modules 430; and so forth. In some examples, load balancing modules 430 may query about computational nodes 500 status, for example by sending messages: at load balancing module 430 startup; at constant intervals; at selected times; and so forth.

In some embodiments, the one or more internal communication modules 440 may be configured to receive information from one or more components of cloud platform 400, and/or to transmit information to one or more components of cloud platform 400. For example, control signals and/or synchronization signals may be sent and/or received through internal communication modules 440. In another example, input information for computer programs, output information of computer programs, and/or intermediate information of computer programs, may be sent and/or received through internal communication modules 440. In another example, information received though internal communication modules 440 may be stored in memory units 210, in shared memory units 410, and so forth. In an additional example, information retrieved from memory units 210 and/or shared memory units 410 may be transmitted using internal communication modules 440. In another example, input data may be transmitted and/or received using internal communication modules 440. Examples of such input data may include input data inputted by a user using user input devices.

In some embodiments, the one or more external communication modules 450 may be configured to receive and/or to transmit information. For example, control signals may be sent and/or received through external communication modules 450. In another example, information received though external communication modules 450 may be stored in memory units 210, in shared memory units 410, and so forth. In an additional example, information retrieved from memory units 210 and/or shared memory units 410 may be transmitted using external communication modules 450. In another example, input data may be transmitted and/or received using external communication modules 450. Examples of such input data may include: input data inputted by a user using user input devices; information captured from the environment of apparatus 200 using one or more sensors; and so forth. Examples of such sensors may include: audio sensors 250; image sensors 260; motion sensors 270; positioning sensors 275; chemical sensors; temperature sensors; barometers; pressure sensors; proximity sensors; electrical impedance sensors; electrical voltage sensors; electrical current sensors; and so forth.

FIGS. 6A, 6B, 6C and 6D illustrate some possible communication flows, including communication flow 601, communication flow 602, communication flow 603, and communication flow 604. Communication flows 601, 602, 603 and 604 will be described with reference to apparatus 200*a* and apparatus 200*b* for exemplary purposes only, and it should be understood that communication flows 601, 602, 603 and 604 could be applied equally to any suitable computational devices incorporating a processing unit and a communication module. Other examples of such suitable computational devices may include: server 300, cloud platform 400, computational node 500, and so forth. Communication flows 601, 602, 603 and 604 herein will be described with reference to network 130 for exemplary purposes only, and it should be understood that communication flows 601, 602, 603 and 604 could be applied equally using any means that enable communication between two or more computational devices. In communication flows 601, 602, 603 and 604, apparatus 200*a* may communicate with apparatus 200*b* through communication network 130. For example, apparatus 200*a* may use its communication modules 230 to communicate with communication modules 230 of apparatus 200*b*.

Figure 6A:
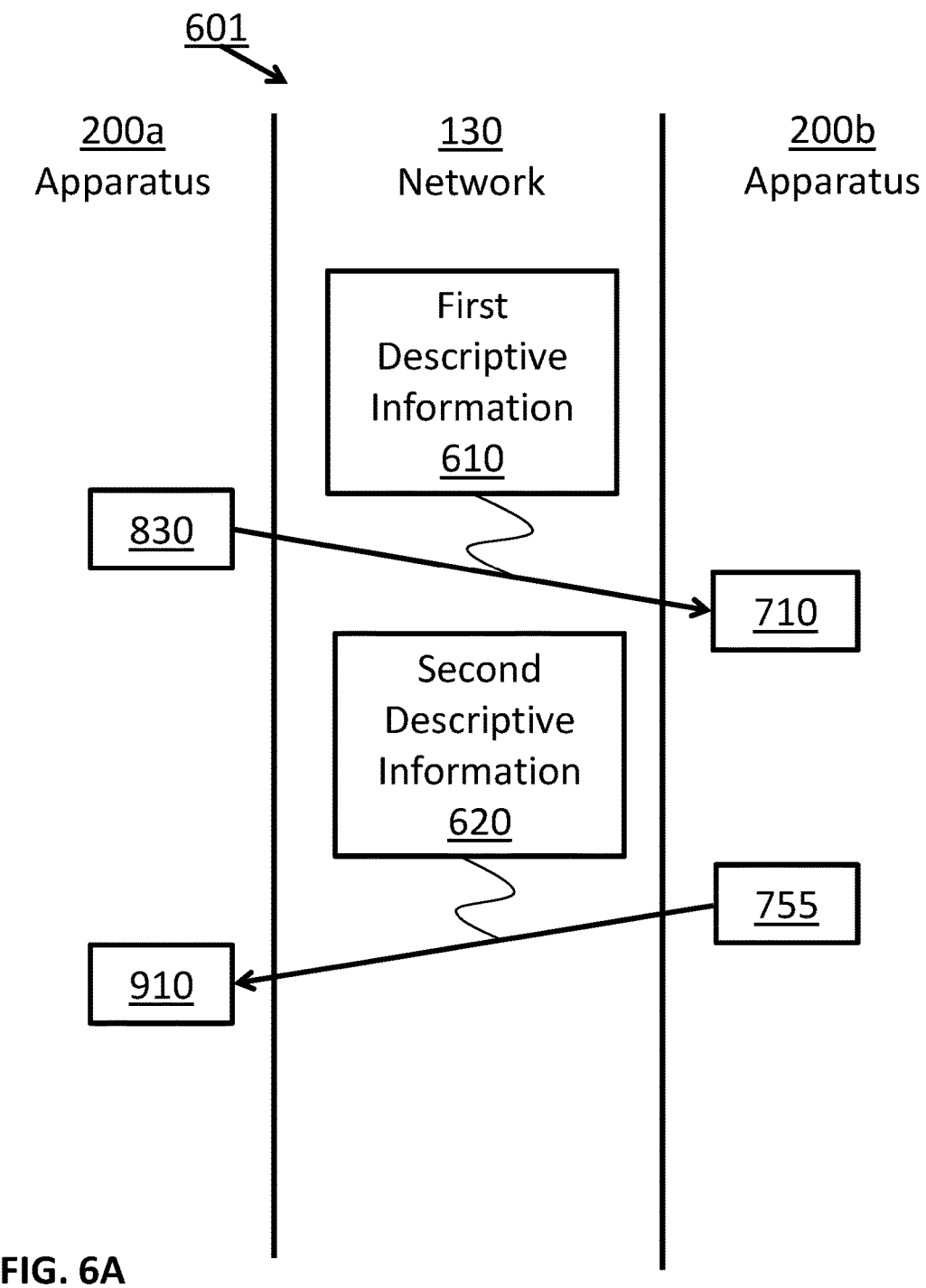
FIGS. 6A, 6B, 6C and 6D illustrate some possible communication flows.

In communication flow 601 depicted in FIG. 6A, apparatus 200*a* may transmit first descriptive information 610 to apparatus 200*b* (Step 830, described below), and apparatus 200*b* may receive first descriptive information 610 (Step 710, described below). In some examples, apparatus 200*b* may generate second descriptive information 620 (for example, by Step 750 described below). In communication flow 601, after receiving first descriptive information 610 (Step 710, described below), apparatus 200*b* may transmit second descriptive information 620 to apparatus 200*a* (Step 755, described below), and apparatus 200*a* may receive second descriptive information 620 (module 910, described below).

Figure 6B:
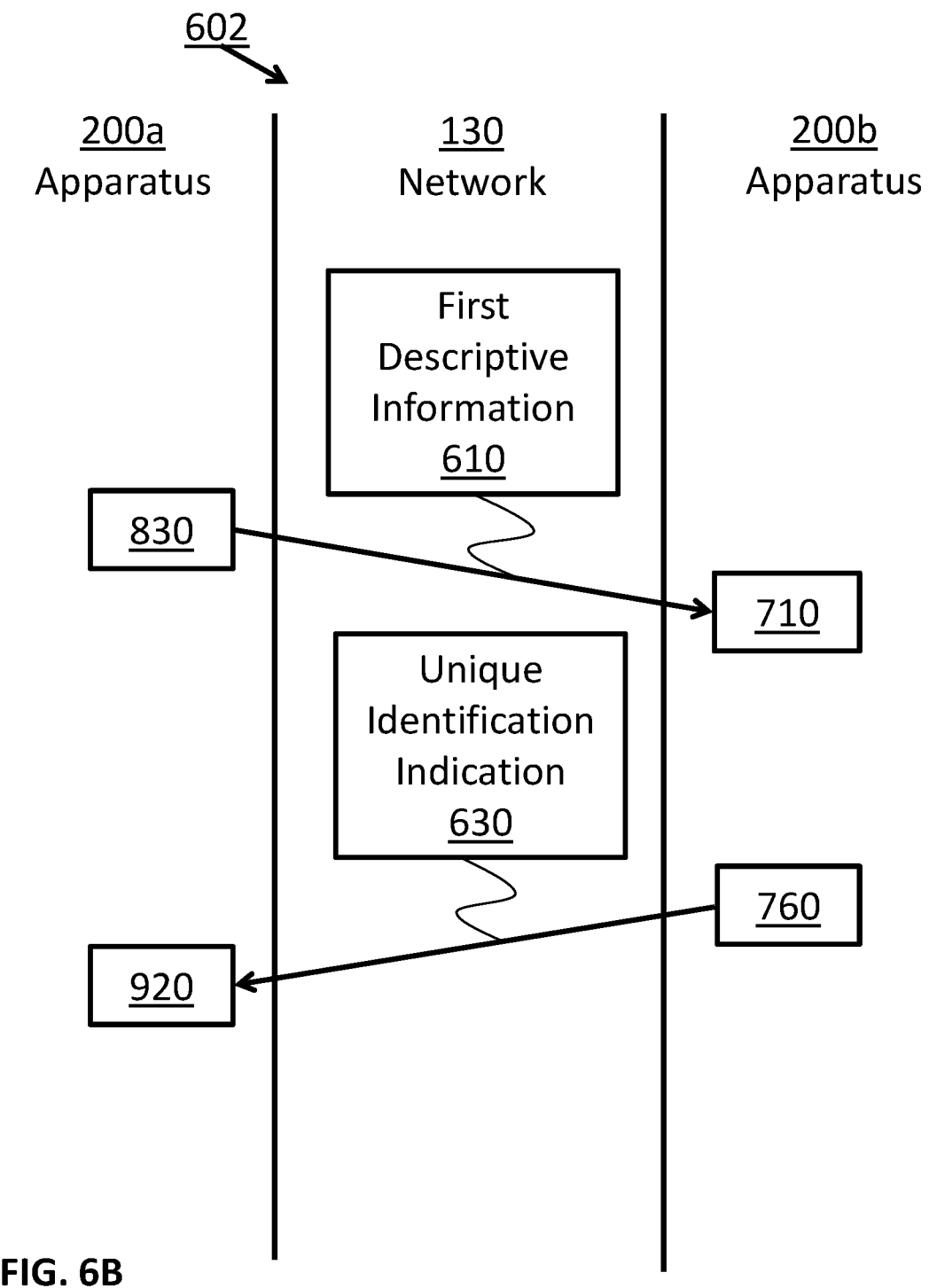

In communication flow 602 depicted in FIG. 6B, apparatus 200*a* may transmit first descriptive information 610 to apparatus 200*b* (Step 830, described below), and apparatus 200*b* may receive first descriptive information 610 (Step 710, described below). In communication flow 602, after receiving first descriptive information 610 (Step 710, described below), apparatus 200*b* may transmit unique identification indication 630 to apparatus 200*a* (Step 760, described below), and apparatus 200*a* may receive unique identification indication 630 (module 920, described below).

Figure 6C:
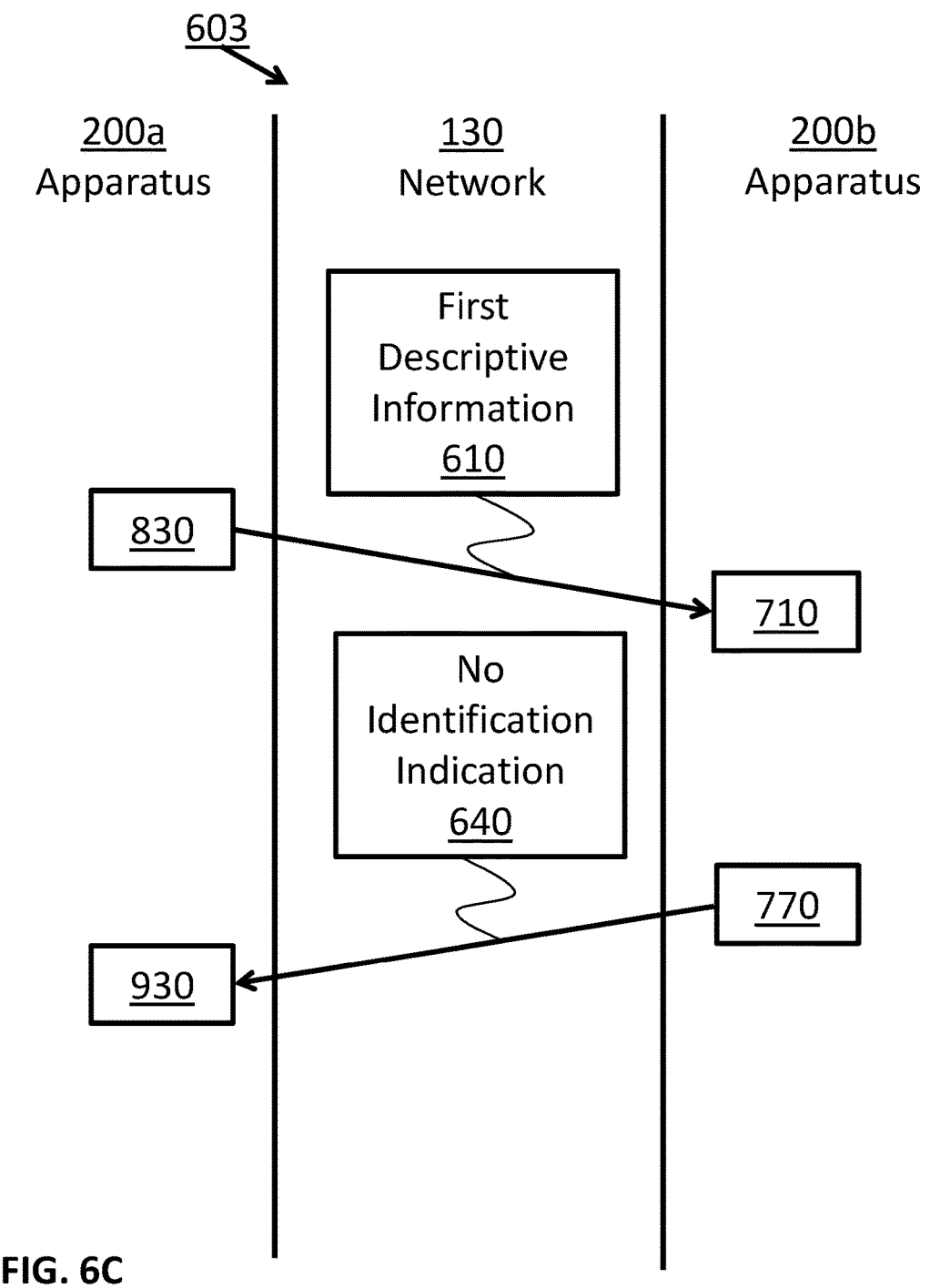

In communication flow 603 depicted in FIG. 6C, apparatus 200a may transmit first descriptive information 610 to apparatus 200b (Step 830, described below), and apparatus 200b may receive first descriptive information 610 (Step 710, described below). In communication flow 603, after receiving first descriptive information 610 (Step 710, described below), apparatus 200b may transmit no identification indication 640 to apparatus 200a (Step 770, described below), and apparatus 200a may receive no identification indication 640 (module 930, described below).

Figure 6D:
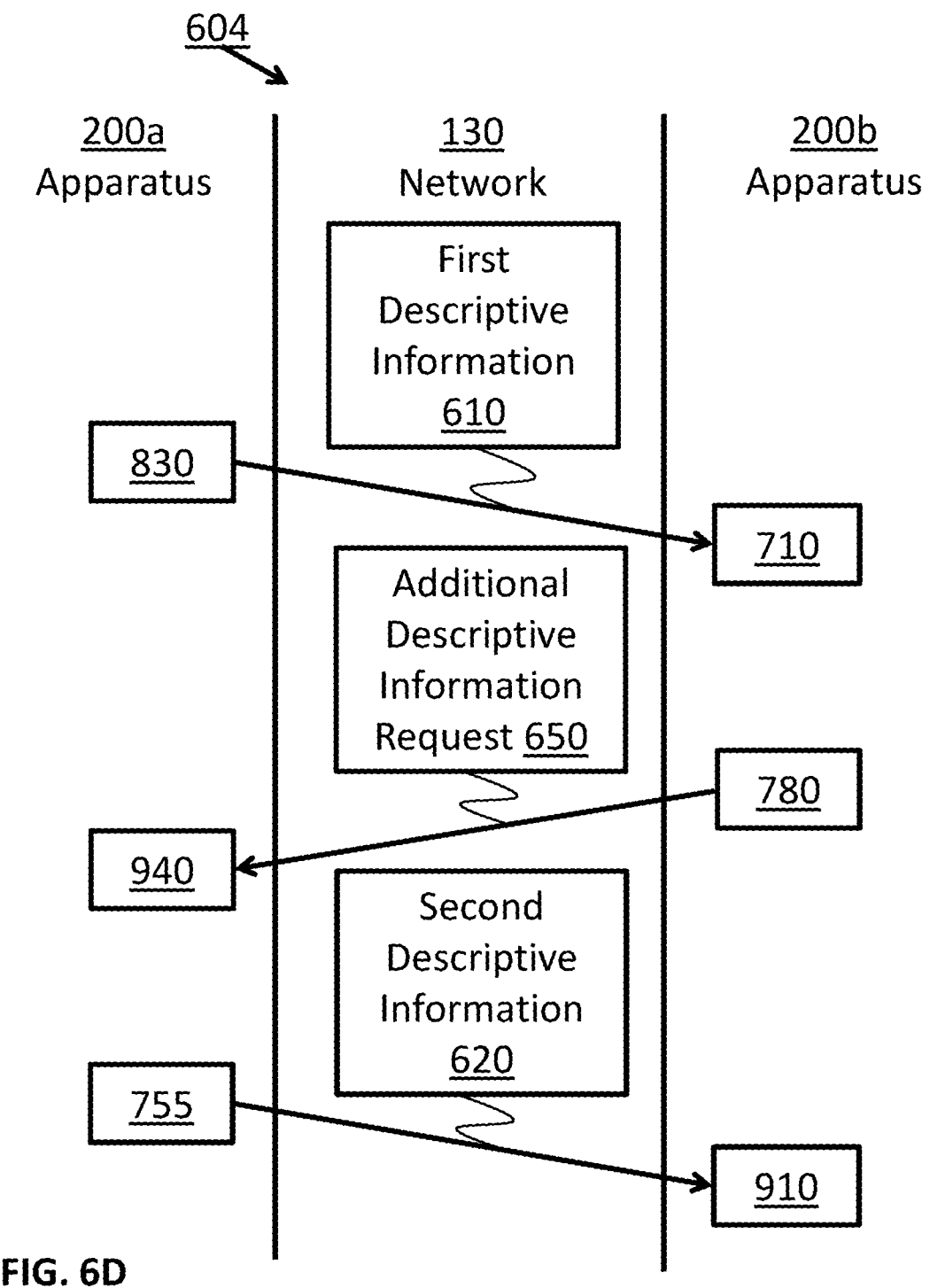

In communication flow 604 depicted in FIG. 6D, apparatus 200a may transmit first descriptive information 610 to apparatus 200b (Step 830, described below), and apparatus 200b may receive first descriptive information 610 (Step 710, described below). In communication flow 604, after receiving first descriptive information 610 (Step 710, described below), apparatus 200b may transmit additional descriptive information request 650 to apparatus 200a (Step 780, described below), and apparatus 200a may receive additional descriptive information request 650 (module 940, described below). Further in communication flow 604, after receiving additional descriptive information request 650 (module 940, described below), apparatus 200a may transmit second descriptive information 620 to apparatus 200b (Step 755, described below), and apparatus 200b may receive second descriptive information 620 (module 910, described below).

In some embodiments, first descriptive information 610 and/or second descriptive information 620 may comprise descriptive information. In some examples, the descriptive information may be used to detect items, objects, faces, events, actions, and so forth, in an environment, for example by Step 730 (described below). In some examples, the descriptive information may be used to select items from a group of items, objects from a group of objects, faces from a group of faces, events from a group of events, actions from a group of actions, and so forth. For example, a subset of a group of items detected in an environment may be selected based on the descriptive information, for example by Step 730 (described below).

In some embodiments, first descriptive information 610 and/or second descriptive information 620 may comprise one or more parameters to a visual detection algorithm, such as an object detection algorithm, a face detection algorithm, an event detection algorithm, an action detection algorithm, and so forth. Some examples of such parameters to a visual detection algorithm may include: visual template information, shape information, color information, motion information, one or more pictures and/or video clips of an item, one or more weights, and so forth.

In some embodiments, first descriptive information 610 and/or second descriptive information 620 may comprise a plurality of descriptive information records. In some examples, a descriptive information record may be used to detect items, objects, faces, events, actions, and so forth. In some examples, a descriptive information record may be used to select items from a group of items, objects from a group of objects, faces from a group of faces, events from a group of events, actions from a group of actions, and so forth. For example, a subset of a group of items detected in an environment may be selected based on the descriptive information record. In some examples, a descriptive information record may comprise one or more parameters to a visual detection algorithm, such as an object detection algorithm, a face detection algorithm, an event detection algorithm, an action detection algorithm, and so forth.

In some embodiments, first descriptive information 610 and/or second descriptive information 620 may comprise capturing parameters, such as the capturing parameters used by image sensor 260. Some examples of such capturing parameters may include: position of the image sensor, orientation of the image sensor, angle of view, capturing image resolution, capturing frame rate, compression ratio, capturing time, cropping parameters, focus point, exposure time, aperture size, gain, field of view, and so forth.

In some embodiments, first descriptive information 610 and/or second descriptive information 620 may comprise spatial information. In some examples, the spatial information may comprise spatial information related to the field of view of image sensor 260, such as position of the image sensor, orientation of the image sensor, angle of view, field of view, and so forth. In some examples, the spatial information may comprise spatial information related to estimated location of detected items. For example, an estimated location may be specified as an orientation from a position towards the location, as a relative position, as an absolute position, as an angular range of orientations from a position, as an area, and so forth.

In some embodiments, first descriptive information 610 and/or second descriptive information 620 may comprise temporal information. In some examples, the temporal information may comprise time of viewing of an object, time of detection, time of capturing of an image, time of occurrence of an action and/or event, and so forth.

In some embodiments, unique identification indication 630 may indicate that descriptive information, such as first descriptive information 610, corresponded to a unique item and/or to a single item, for example as identified by Step 730 (described below). For example, unique identification indication 630 may indicate that the descriptive information corresponds to a single item, a single object, a single person, a single face, a unique event, a unique action, and so forth.

In some embodiments, no identification indication 640 may indicate that descriptive information, such as first descriptive information 610, corresponded to no item, for example as identified by Step 730 (described below). For example, no identification indication 640 may indicate that the descriptive information corresponds to no item, to no object, to no person, to no face, to no event, to no action, and so forth.

In some embodiments, additional descriptive information request 650 may indicate a request to provide additional descriptive information, such as second descriptive information 620.

Figure 7:
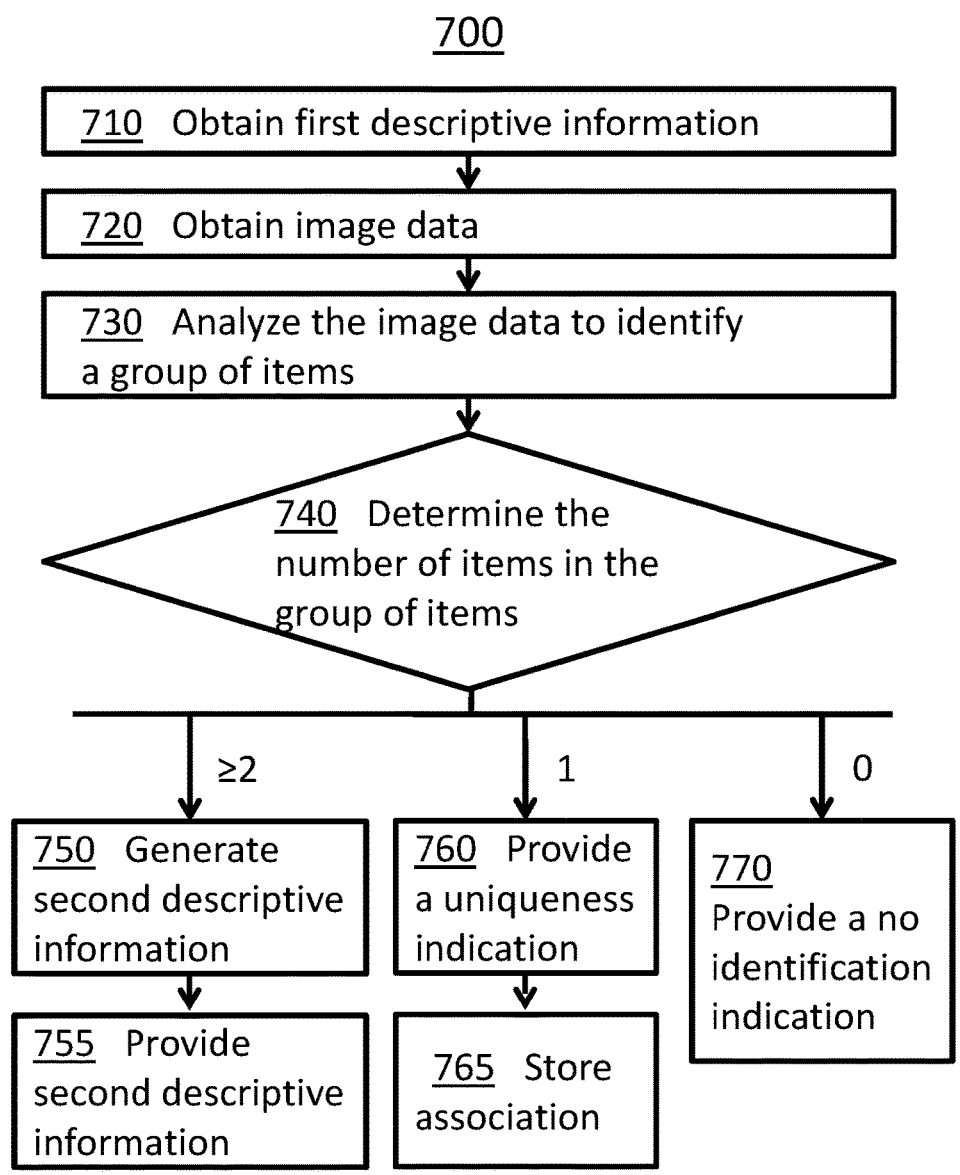
FIG. 7 illustrates an example of a process for visual recognition.

FIG. 7 illustrates an example of a process 700 for visual recognition. In some examples, process 700, as well as all individual steps therein, may be performed by various aspects of: apparatus 200; server 300; cloud platform 400; computational node 500; and so forth. For example, process 700 may be performed by processing units 220, executing software instructions stored within memory units 210 and/or within shared memory modules 410. In this example, process 700 may comprise: obtaining first descriptive information (Step 710); obtaining image data (Step 720); analyzing the image data to identify a group of items (Step 730); and determining the number of items in the group of items (Step 740). Based on the determined number of items in the group of items, process 700 may continue. In some examples, when the number of items in the group of items is at least two, process 700 may further comprise: generating second descriptive information (Step 750) and/or providing second descriptive information (Step 755). In other examples, when the number of items in the group of items is at least two, process 700 may further comprise: providing additional descriptive information request (Step 780). In some examples, when the number of items in the group of items is one, process 700 may further comprise: providing a uniqueness indication (Step 760) and/or storing association (Step 765). In some examples, when the number of items in the group of items is zero, process 700 may further comprise: providing a no identification indication (Step 770). In some implementations, process 700 may comprise one or more additional steps, while some of the steps listed above may be modified or excluded. For example, in some cases Step 750 and/or Step 755 may be excluded from process 700. For example, in some cases Step 760 and/or Step 765 may be excluded from process 700. For example, in some cases Step 770 may be excluded from process 700. For example, in some cases Step 780 may be excluded from process 700. In some implementations, one or more steps illustrated in FIG. 7 may be executed in a different order and/or one or more groups of steps may be executed simultaneously and vice versa. For example: Step 720 may be executed before, after and/or simultaneously with Step 710; Step 730 may be executed after and/or simultaneously with Step 710 and/or Step 720; Step 740 may be executed after and/or simultaneously with Step 730; Step 765 may be executed before, after and/or simultaneously with Step 760; and so forth. Examples of possible execution manners of process 700 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 8:
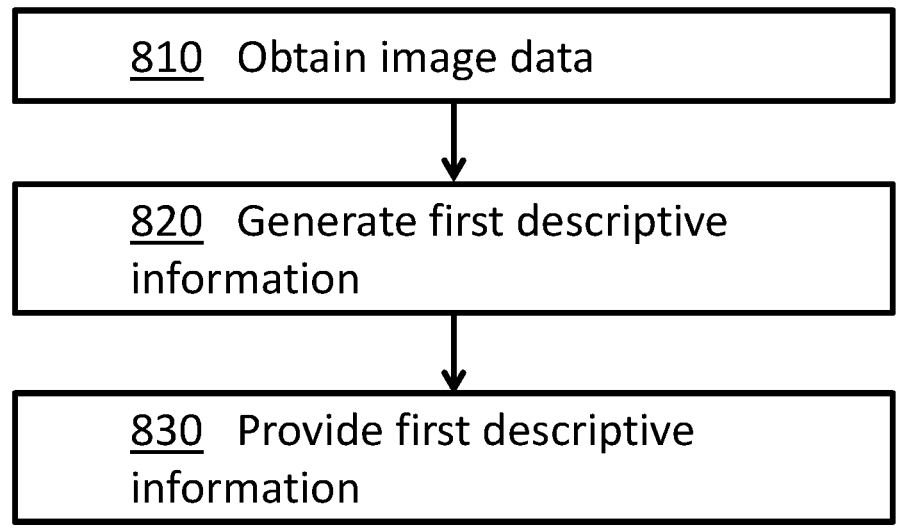
FIG. 8 illustrates an example of a process for visual recognition.

FIG. 8 illustrates an example of a process 800 for visual recognition. In some examples, process 800, as well as all individual steps therein, may be performed by various aspects of: apparatus 200; server 300; cloud platform 400; computational node 500; and so forth. For example, process 800 may be performed by processing units 220, executing software instructions stored within memory units 210 and/or within shared memory modules 410. In this example, process 800 may comprise: obtaining image data (Step 810); generating first descriptive information (Step 820); and providing first descriptive information (Step 830). In some implementations, process 800 may comprise one or more additional steps, while some of the steps listed above may be modified or excluded. In some implementations, one or more steps illustrated in FIG. 8 may be executed in a different order and/or one or more groups of steps may be executed simultaneously and vice versa. For example, Step 820 may be executed after and/or simultaneously with Step 810. Examples of possible execution manners of process 800 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 9:
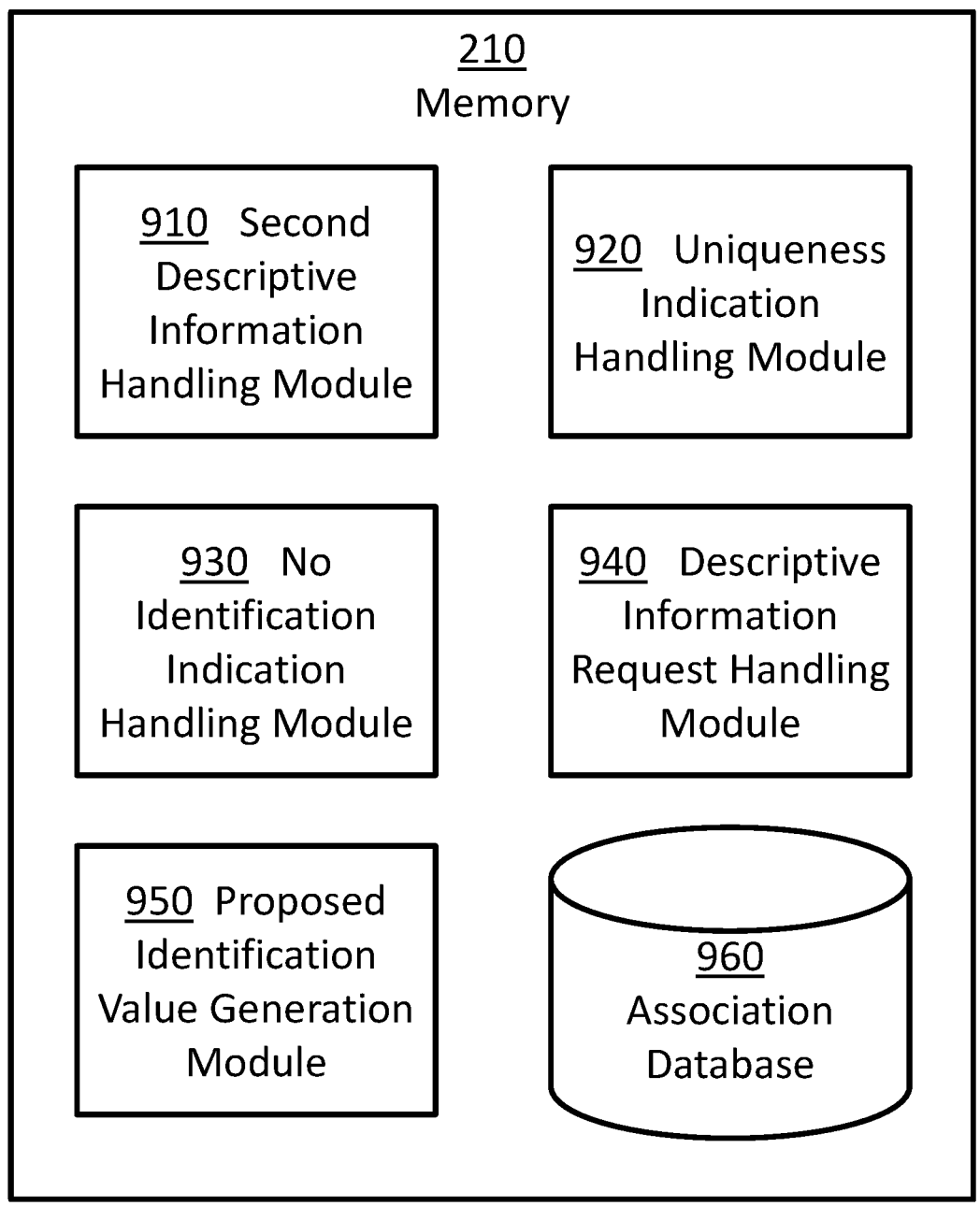
FIG. 9 illustrates an exemplary embodiment of a memory storing a plurality of modules.

FIG. 9 illustrates an exemplary embodiment of memory 210 storing a plurality of modules. Memory 210 may store more or fewer modules than those shown in FIG. 9. In this example, memory 210 may comprise: second descriptive information handling module 910, uniqueness indication handling module 920, no identification indication handling module 930, descriptive information request handling module 940, proposed identification value generation module 950, and association database 960. Modules 910, 920, 930, 940 and 950 may be implemented in software, hardware, firmware, a mix of any of those, or the like. For example, if the modules are implemented in software, they may contain software instructions for execution by at least one processing device, such as processing unit 220, by apparatus 200, by server 300, by cloud platform 400, by computational node 500, and so forth.

In some embodiments, obtaining first descriptive information (Step 710) and/or second descriptive information handling module (910) may comprise obtaining descriptive information. In some embodiments, obtaining first descriptive information (Step 710) and/or second descriptive information handling module (910) may comprise receiving at least part of the descriptive information using one or more communication devices, such as communication modules 230, internal communication modules 440, external communication modules 450, and so forth. In some embodiments, obtaining first descriptive information (Step 710) and/or second descriptive information handling module (910) may comprise reading at least part of the descriptive information from memory units, such as memory units 210, shared memory modules 410, and so forth.

In some embodiments, obtaining first descriptive information (Step 710) and/or second descriptive information handling module (910) may comprise obtaining a proposed identification value. In some embodiments, obtaining first descriptive information (Step 710) and/or second descriptive information handling module (910) may comprise receiving a proposed identification value using one or more communication devices, such as communication modules 230, internal communication modules 440, external communication modules 450, and so forth. In some embodiments, obtaining first descriptive information (Step 710) and/or second descriptive information handling module (910) may comprise reading a proposed identification value from memory units, such as memory units 210, shared memory modules 410, and so forth.

In some embodiments, obtaining first descriptive information (Step 710) may comprise obtaining first descriptive information 610. In some examples, at least part of the first descriptive information 610 may be generated by another step (such as Step 820), and/or by another process (such as process 800), and/or by another device, and so forth. In some examples, first descriptive information 610 may be provided to Step 710 by Step 830.

In some embodiments, second descriptive information handling module (910) may comprise obtaining second descriptive information 620. In some examples, at least part of the second descriptive information 620 may be generated by another step (such as Step 750), and/or by another process (such as process 700), and/or by another device, and so forth. In some examples, second descriptive information 620 may be provided to module 910 by Step 755.

In some embodiments, second descriptive information handling module (910) may comprise launching new process 700 in which second descriptive information 620 may serve as the new first descriptive information 610, and in which obtaining first descriptive information (Step 710) may obtain the second descriptive information 620 as the first descriptive information 610.

In some embodiments, obtaining image data (Step 720) and/or obtaining image data (810) may comprise obtaining image data captured using one or more image sensors, for example using image sensors 260. Some examples of image data may include: one or more images; one or more portions of one or more images; sequence of images; one or more video clips; one or more portions of one or more video clips; one or more video streams; one or more portions of one or more video streams; information based, at least in part, on any of the above; any combination of the above; and so forth.

In some examples, obtaining image data (Step 720) and/or obtaining image data (810) may comprise, in addition or alternatively to obtaining image data and/or other input data, obtaining audio data captured using one or more audio sensors, for example using audio sensors 250. Examples of audio data may include: one or more audio recordings; one or more portions of one or more audio recordings; one or more audio streams; one or more portions of one or more audio streams; information based, at least in part, on any of the above; any combination of the above; and so forth.

In some examples, obtaining image data (Step 720) and/or obtaining image data (810) may comprise, in addition or alternatively to obtaining image data and/or other input data, obtaining motion information captured using one or more motion sensors, for example using motion sensors 270. Examples of such motion information may include: indications related to motion of objects; measurements related to the velocity of objects; measurements related to the acceleration of objects; indications related to motion of motion sensor 270; measurements related to the velocity of motion sensor 270; measurements related to the acceleration of motion sensor 270; information based, at least in part, on any of the above; any combination of the above; and so forth.

In some examples, obtaining image data (Step 720) and/or obtaining image data (810) may comprise, in addition or alternatively to obtaining image data and/or other input data, obtaining position information captured using one or more positioning sensors, for example using positioning sensors 275. Examples of such position information may include: indications related to the position of positioning sensors 275; indications related to changes in the position of positioning sensors 275; measurements related to the position of positioning sensors 275; indications related to the orientation of positioning sensors 275; indications related to changes in the orientation of positioning sensors 275; measurements related to the orientation of positioning sensors 275; measurements related to changes in the orientation of positioning sensors 275; information based, at least in part, on any of the above; any combination of the above; and so forth.

In some embodiments, obtaining image data (Step 720) and/or obtaining image data (810) may comprise receiving input data using one or more communication devices, such as communication modules 230, internal communication modules 440, external communication modules 450, and so forth. Examples of such input data may include: input data captured using one or more sensors; image data captured using image sensors, for example using image sensors 260; audio data captured using audio sensors, for example using audio sensors 250; motion information captured using motion sensors, for example using motion sensors 270; position information captured using positioning sensors, for example using positioning sensors 275; and so forth.

In some embodiments, obtaining image data (Step 720) and/or obtaining image data (810) may comprise reading input data from memory units, such as memory units 210, shared memory modules 410, and so forth. Examples of such input data may include: input data captured using one or more sensors; image data captured using image sensors, for example using image sensors 260; audio data captured using audio sensors, for example using audio sensors 250; motion information captured using motion sensors, for example using motion sensors 270; position information captured using positioning sensors, for example using positioning sensors 275; and so forth.

In some embodiments, analyzing image data, for example by Step 730 and/or Step 820, may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time order series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some examples of such image features may comprise information based on and/or related to: edges; corners; blobs; ridges; Scale Invariant Feature Transform (SIFT) features; temporal features; and so forth.

In some embodiments, analyzing image data, for example by Step 730 and/or Step 820, may comprise analyzing the image data and/or the preprocessed image data using one or more rules, one or more functions and/or procedures, one or more neural networks, one or more object detection algorithms, one or more face detection algorithms, one or more visual event detection algorithms, one or more action detection algorithms, one or more motion detection algorithms, one or more background subtraction algorithms, one or more inference models, and so forth. Some examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing image data to identify a group of items (Step 730) may comprise analyzing the image data and/or the preprocessed image data to identify a group of items matching descriptive information, such as the first descriptive information 610 obtained by Step 710. In some examples, analyzing image data to identify a group of items (Step 730) may comprise analyze the image data and/or the preprocessed image data to detect a group of items, objects, faces, events, actions, and so forth, in an environment.

In some examples, analyzing image data to identify a group of items (Step 730) may comprise using object detection algorithms to detect objects in the image data that match the descriptive information. The descriptive information may comprise one or more parameters of the object detection algorithms, one or more characteristics of the objects, one or more pictures of the objects, and so forth. Some examples of such object detection algorithms may include: appearance based object detection algorithms, gradient based object detection algorithms, gray scale object detection algorithms, color based object detection algorithms, histogram based object detection algorithms, feature based object detection algorithms, machine learning based object detection algorithms, neural networks based object detection algorithms, 2D object detection algorithms, 3D object detection algorithms, still image based object detection algorithms, video based object detection algorithms, and so forth.

In some examples, analyzing image data to identify a group of items (Step 730) may comprise using face detection algorithms to detect faces matching the descriptive information in the image data. The descriptive information may comprise one or more parameters of the face detection algorithms, one or more characteristics of the faces, one or more pictures of the faces, one or more face models, and so forth. Some examples of such face detection algorithms may include: appearance based face detection algorithms, feature based face detection algorithms, gradient based face detection algorithms, gray scale face detection algorithms, color based face detection algorithms, PCA based face detection algorithms, ICA based face detection algorithms, LDA based face detection algorithms, dimensional reduction based face detection algorithms, machine learning based face detection algorithms, neural network based face detection algorithms, 2D face detection algorithms, 3D face detection algorithms, still image based face detection algorithms, video based face detection algorithms, and so forth.

In some examples, analyzing image data to identify a group of items (Step 730) may comprise using visual event detection algorithms to detect events matching the descriptive information in the image data. The descriptive information may comprise one or more parameters of the visual event detection algorithms, one or more characteristics of the visual events, one or more video clips of the visual events, one or more visual event templates, and so forth. Some examples of such visual event detection algorithms may include: appearance based visual event detection algorithms, feature based visual event detection algorithms, gradient based visual event detection algorithms, gray scale visual event detection algorithms, color based visual event detection algorithms, machine learning based visual event detection algorithms, neural network based visual event detection algorithms, 2D visual event detection algorithms, 3D visual event detection algorithms, motion based visual event detection algorithms, video based visual event detection algorithms, and so forth.

In some examples, analyzing image data to identify a group of items (Step 730) may comprise using an action detection algorithm to detect actions matching the descriptive information in the image data. The descriptive information may comprise one or more parameters of the action detection algorithms, one or more characteristics of the actions, one or more video clips of the actions, one or more action templates, and so forth. Some examples of such action detection algorithms may include: appearance based action detection algorithms, feature based action detection algorithms, gradient based action detection algorithms, gray scale action detection algorithms, color based action detection algorithms, machine learning based action detection algorithms, neural network based action detection algorithms, 2D action detection algorithms, 3D action detection algorithms, motion based action detection algorithms, video based action detection algorithms, gesture recognition algorithms, and so forth.

In some embodiments, analyzing image data to identify a group of items (Step 730) may comprise analyzing the image data and/or the preprocessed image data to identify a group of items matching a plurality of descriptive information records, such as a plurality of descriptive information records contained in the first descriptive information 610 obtained by Step 710. In some examples, an descriptive information record may be used to identify an intermediate group of items matching the descriptive information record, for example as described above, and the group of items identified by Step 730 may comprise the intersection of the intermediate groups of items. In some examples, analyzing image data to identify a group of items (Step 730) may comprise using a plurality of object detectors to identify intermediate groups of objects in the image data that match the plurality of descriptive information records, for example where an object detector corresponds to a descriptive information record; and calculating the intersection of the intermediate groups of items. In some examples, analyzing image data to identify a group of items (Step 730) may comprise using a plurality of face detectors to identify intermediate groups of faces in the image data that match the plurality of descriptive information records, for example where a face detector corresponds to one descriptive information record; and calculating the intersection of the intermediate groups of items. In some examples, analyzing image data to identify a group of items (Step 730) may comprise using a plurality of visual event detectors to identify intermediate groups of visual events in the image data that match the plurality of descriptive information records, for example where a visual event detector corresponds to one descriptive information record; and calculating the intersection of the intermediate groups of items. In some examples, analyzing image data to identify a group of items (Step 730) may comprise using a plurality of action detectors to identify intermediate groups of actions in the image data that match the plurality of descriptive information records, for example where an action detector corresponds to one descriptive information record; and calculating the intersection of the intermediate groups of items.

In some embodiments, analyzing image data to identify a group of items (Step 730) may comprise limiting the search area for the items within the image data based on the descriptive information. In some examples, the descriptive information may comprise capturing parameters of an image sensor used to capture an image of an item, for example by another process and/or device, and a search area may be calculated based on the capturing parameters, such as the capturing time, the field of view, the position and/or orientation of the image sensor, and so forth. In some examples, the descriptive information may comprise spatial information related to the estimated locations of items, and the search area may be calculated to include the estimated locations and/or the surroundings of the estimated locations.

In some embodiments, analyzing image data to identify a group of items (Step 730) may comprise limiting the search time frame for the items within the image data based on the descriptive information. In some examples, the descriptive information may comprise temporal information related to the estimated occurrence time and/or viewing time of the items, and the search time frame may be calculated to include the estimated occurrence time and/or viewing time.

In some embodiments, determining the number of items in the group of items (Step 740) may comprise determining the number of items identified by Step 730 and/or the number of items matching the descriptive information, such as the first descriptive information 610 obtained by Step 710. In some examples, when the determined number of items is at least two, the flow of process 700 may continue to generating second descriptive information (Step 750) and/or providing second descriptive information (Step 755). In other examples, when the determined number of items is at least two, the flow of process 700 may continue to providing additional descriptive information request (Step 780). In some examples, when the determined number of items is one, the flow of process 700 may continue to providing a uniqueness indication (Step 760) and/or store association (Step 765). In some examples, when the determined number of items is zero, the flow of process 700 may continue to providing a no identification indication (Step 770).

In some embodiments, generating second descriptive information (Step 750) may comprise generating one or more descriptive information records. In some examples, the generated one or more descriptive information records may comprise the second descriptive information 620. In some examples, generating second descriptive information (Step 750) may generate descriptive information records, where each generated descriptive information record matches a subset of the group of items identified by Step 730 and/or a subset of the group of items that matches the first descriptive information 610. In some examples, at least one item of the group of items may not be included in the subset of the group of items. In some examples, the one or more descriptive information records generated by Step 750 may comprise at least two descriptive information records, each descriptive information record may match a subset of the group of items, and at least two subsets may differ from one another. In some examples, generating second descriptive information (Step 750) may comprise modifying and/or making additions to the first descriptive information 610 to obtain the second descriptive information 620 and/or other descriptive information records.

In some embodiments, generating second descriptive information (Step 750) may identify one or more parameters to a visual detection algorithm, such as an object detection algorithm, a face detection algorithm, an event detection algorithm, an action detection algorithm, and so forth, and the generated descriptive information records may comprise the identified one or more parameters. Some examples of such parameters may include: visual template information, shape information, color information, motion information, one or more pictures, one or more video clips, one or more weights, and so forth.

In some embodiments, generating second descriptive information (Step 750) may determine spatial information, and the generated descriptive information records may comprise the determined spatial information. In some examples, the spatial information may comprise spatial information related to the field of view of image sensor 260, such as position of the image sensor, orientation of the image sensor, angle of view, field of view, and so forth. In some examples, the spatial information may comprise spatial information related to estimated location of detected items. For example, an estimated location may be specified as an orientation from a position towards the location, as a relative position, as an absolute position, as an angular range of orientations from a position, as an area, and so forth.

In some embodiments, generating second descriptive information (Step 750) may determine temporal information, and the generated descriptive information records may comprise the determined temporal information. In some examples, the temporal information may comprise time of viewing of an object, time of detection, time of capturing of an image, time of occurrence of an action and/or event, and so forth.

In some embodiments, generating first descriptive information (Step 820) may comprise generating descriptive information, such as first descriptive information 610. In some embodiments, generating first descriptive information (Step 820) may identify one or more parameters to a visual detection algorithm that enable the visual detection algorithm to detect a single item in the image data obtained by Step 810. Some examples of such visual detection algorithms may include: an object detection algorithm, a face detection algorithm, an event detection algorithm, an action detection algorithm, and so forth. The generated first descriptive information 610 may comprise the identified one or more parameters. Some examples of such parameters may include: visual template information, shape information, color information, motion information, one or more pictures, one or more video clips, one or more weights, and so forth.

In some embodiments, generating first descriptive information (Step 820) may comprise generating descriptive information, such as first descriptive information 610, that match a specific item (such as a specific object, a specific face, a specific event, a specific action, etc.) in the image data obtained by Step 810. The specific item may be specified to Step 820 by a user, by a different process, by a different device, and so forth.

In some embodiments, generating first descriptive information (Step 820) may comprise generating a plurality of descriptive information records, and generating descriptive information, such as first descriptive information 610, that comprises the plurality of descriptive information records. In some examples, a descriptive information record may comprise input and/or parameters to a visual detector. Some examples of such visual detectors may include: an object detector, a face detector, an event detector, an action detector, and so forth. The generated descriptive information record may comprise one or more identified parameters to the visual detector. Some examples of such parameters may include: visual template information, shape information, color information, motion information, one or more pictures, one or more video clips, one or more weights, and so forth.

In some embodiments, generating first descriptive information (Step 820) may comprise determining spatial information, and the generated first descriptive information 610 may comprise the determined spatial information. In some examples, the spatial information may comprise spatial information related to the field of view of image sensor 260, such as position of the image sensor, orientation of the image sensor, angle of view, field of view, and so forth. In some examples, the spatial information may comprise spatial information related to estimated location of a specified item. For example, an estimated location may be specified as an orientation from a position towards the location, as a relative position, as an absolute position, as an angular range of orientations from a position, as an area, and so forth.

In some embodiments, generating first descriptive information (Step 820) may comprise determining temporal information, and the generated first descriptive information 610 may comprise the determined temporal information. In some examples, the temporal information may comprise time of viewing of an object and/or a specified item, time of detection, time of capturing of an image, time of occurrence of an action and/or event, and so forth.

In some examples, first descriptive information 610 may match a single item according to process 800 and/or Step 820, for example based on image data obtained by Step 810, while the same first descriptive information 610 may match zero, one, two, three, four, five or more items according to process 700 and/or Step 720, for example based on image data obtained by Step 720. For example, the field of view of the image data obtained by Step 810 may differ from the field of view of the image data obtained by Step 720, making some items that are visible in the image data obtained by Step 810 not visible in the image data obtained by Step 720 and vice versa (see FIG. 10 and corresponding description below for an illustration). In another example, the viewing angle in the image data obtained by Step 810 may differ from the viewing angle of the image data obtained by Step 720, therefore changing the appearance of items and consequently making some items that match the first descriptive information 610 in the image data obtained by Step 810 mismatch to the first descriptive information 610 in the image data obtained by Step 720 and vice versa. In another example, the capturing time of the image data obtained by Step 810 may differ from the capturing time of the image data obtained by Step 720, therefore making some items that are present in the image data obtained by Step 810 absent from the image data obtained by Step 720 and vice versa.

In some embodiments, providing second descriptive information (Step 755) and/or providing first descriptive information (Step 830) may comprise providing descriptive information. In some embodiments, providing second descriptive information (Step 755) and/or providing first descriptive information (Step 830) may comprise transmitting at least part of the descriptive information using one or more communication devices, such as communication modules 230, internal communication modules 440, external communication modules 450, and so forth. In some embodiments, providing second descriptive information (Step 755) and/or providing first descriptive information (Step 830) may comprise writing at least part of the descriptive information to memory units, such as memory units 210, shared memory modules 410, and so forth.

In some embodiments, providing second descriptive information (Step 755) and/or providing first descriptive information (Step 830) may comprise providing a proposed identification value. In some examples, the provided proposed identification value may be obtained by previous steps (such as Step 710 and/or module 910), may be generated by proposed identification value generation module 950, and so forth. In some embodiments, providing second descriptive information (Step 755) and/or providing first descriptive information (Step 830) may comprise transmitting a proposed identification value using one or more communication devices, such as communication modules 230, internal communication modules 440, external communication modules 450, and so forth. In some embodiments, providing second descriptive information (Step 755) and/or providing first descriptive information (Step 830) may comprise writing a proposed identification value to memory units, such as memory units 210, shared memory modules 410, and so forth.

In some embodiments, providing second descriptive information (Step 755) may comprise providing information, such as the second descriptive information 620, the one or more descriptive information records generated by Step 750, and so forth. The information may be provided to another process, another device, another module, and so forth. For example, the information may be provided to the second descriptive information handling module 910.

In some embodiments, providing first descriptive information (Step 830) may comprise providing information, such as the first descriptive information 610, descriptive information generated by Step 820, and so forth. The information may be provided to another process, another device, another module, and so forth. For example, the information may be provided to process 700, to Step 710, and so forth.

In some embodiments, providing a uniqueness indication (Step 760) may comprise providing unique identification indication, such as unique identification indication 630, for example to another process, another device, another module, and so forth. For example, the unique identification indication may be provided to uniqueness indication handling module 920. In some examples, providing a uniqueness indication (Step 760) may comprise transmitting a unique identification indication using one or more communication devices, such as communication modules 230, internal communication modules 440, external communication modules 450, and so forth. In some embodiments, providing a uniqueness indication (Step 760) may comprise writing a unique identification indication to memory units, such as memory units 210, shared memory modules 410, and so forth.

In some embodiments, storing association (Step 765) may comprise storing an association in memory, for example in association database 960, in memory units 210, shared memory modules 410, and so forth. In some examples, the stored association may comprise an association of descriptive information, such as first descriptive information 610, with an identification value, such as identification value generated by proposed identification value generation module 950, identification value obtained by Step 710, and so forth. In some examples, the stored association may further comprise an association of the descriptive information and/or the identification value with a process and/or an external device, such as the process and/or external device the first descriptive information 610 originated from. In some examples, storing association (Step 765) may comprise verifying that the combination of identification value and/or process and/or external device are not yet registered in association database 960, and in the case that such association already exist, Step 765 may handle this by discarding the new association, by overwriting the existing association with the new association, by notifying a user, by notifying another process and/or device, and so forth. In some examples, storing association (Step 765) may comprise providing the identification value and/or the association to another process, another device, another module, and so forth. For example, the identification value and/or the association may be provided to uniqueness indication handling module 920. For example, the identification value and/or the association may be transmitted using one or more communication devices, such as communication modules 230, internal communication modules 440, external communication modules 450, and so forth. For example, the identification value and/or the association may be provided to another process and/or module by writing the identification value and/or the association to memory, such as memory units 210, shared memory modules 410, and so forth.

In some embodiments, providing a no identification indication (Step 770) may comprise providing a no identification indication, such as no identification indication 640, for example to another process, another device, another module, and so forth. For example, the no identification indication may be provided to no identification indication handling module 930. In some examples, providing a no identification indication (Step 770) may comprise transmitting a no identification indication using one or more communication devices, such as communication modules 230, internal communication modules 440, external communication modules 450, and so forth. In some examples, providing a no identification indication (Step 770) may comprise writing a no identification indication to memory units, such as memory units 210, shared memory modules 410, and so forth.

In some embodiments, providing additional descriptive information request (Step 780) may comprise providing an additional descriptive information request 650, for example to another process, another device, another module, and so forth. For example, the additional descriptive information request 650 may be provided to descriptive information request handling module 940. In some examples, providing additional descriptive information request (Step 780) may comprise transmitting an additional descriptive information request using one or more communication devices, such as communication modules 230, internal communication modules 440, external communication modules 450, and so forth. In some examples, providing additional descriptive information request (Step 780) may comprise writing an additional descriptive information request to memory units, such as memory units 210, shared memory modules 410, and so forth.

In some embodiments, uniqueness indication handling module 920 may comprise launching Step 765 in order to store an association as described above. In some examples, uniqueness indication handling module 920 and Step 760 may exchange additional information describing the identified item, object, face, visual event, action, etc., in order to verify that the two actually identifying the same item, object, face, visual event, action, and so forth. For example, such exchange of information may involve exchange of additional descriptive information, a repetition of processes 800 and 700 regarding the same item, object, face, visual event, action, etc. with different first descriptive information 610 in order to verify that the same item, object, face, visual event, action, etc. is identified, and so forth.

In some embodiments, no identification indication handling module 930 may comprise providing notification to a user, adjusting at least one capturing parameter of image sensor 260 and repeating processes 800 and/or 700, repeating processes 800 and/or 700 with a different descriptive information, and so forth.

In some embodiments, descriptive information request handling module 940 may comprise generating second descriptive information (Step 750) and/or providing second descriptive information (Step 755).

In some embodiments, proposed identification value generation module 950 may comprise generating an identification value to identify an item, an object, a face, an event, an action, and so forth. In some examples, an item, object, face, event, action, etc. may be defined using descriptive information, for example by descriptive information that was found to define unique identification using process 700 and/or process 800 (for example, by reaching uniqueness indication handling module 920). In some examples, the generated identification value may be unique to a process, to a device, to a pair of processes, to a pair of devices, to a pair of a device and a process, and so forth. In some examples, proposed identification value generation module 950 may access association database 960 to find a unique identification value.

Figure 10:
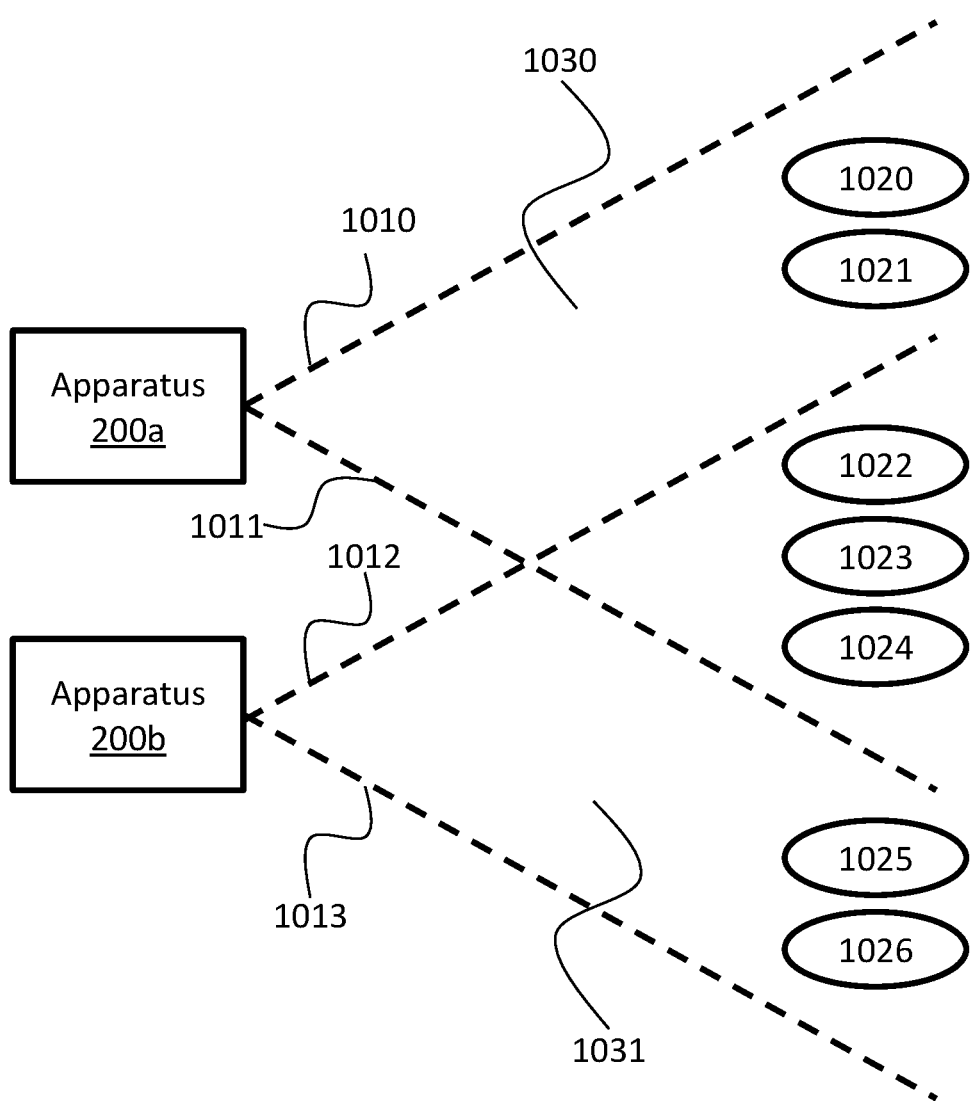
FIG. 10 is a schematic illustration of an example of an environment.

FIG. 10 is a schematic illustration of an example of environment 1000. In this example, two apparatuses, 200a and 200b, capture image data from an environment, for example using image sensors 260. Field of view 1030 of the image data captured by apparatus 200a is demarcated by the space between dashed lines 1010 and 1011, and field of view 1031 of the image data captured by apparatus 200b is demarcated by the space between dashed lines 1012 and 1013. In this example, items 1020 and 1021 are within field of view 1030 but not within field of view 1031, items 1022, 1023 and 1024 are within field of view 1030 and field of view 1031, and items 1025 and 1026 are within field of view 1031 but not within field of view 1030.

In one scenario consistent with this example, apparatus 200a may launch process 800, sending to process 700 of apparatus 200b first descriptive information 610 that matches item 1020 but not items 1021, 1022, 1023 and 1024. In case process 700 of apparatus 200b finds that no item matches first descriptive information 610, process 700 of apparatus 200b may send a no identification indication 640 to no identification indication handling module 930 of apparatus 200a, and in response, no identification indication handling module 930 may request apparatus 200b to change field of view 1031. In case process 700 of apparatus 200b finds that only item 1025 matches the first descriptive information 610, process 700 of apparatus 200b may wrongly send a unique identification indication 630 to uniqueness indication handling module 920, and Step 760 and uniqueness indication handling module 920 may discover that the unique identification indication 630 was wrongly sent by exchanging additional information about the identified item. In case process 700 of apparatus 200b finds that items 1025 and 1026 matches the first descriptive information 610, process 700 of apparatus 200b may generate and send second descriptive information 620 that differentiate between item 1025 and item 1026, which apparatus 200a may handle using second descriptive information handling module 910, by launching new process 700 in apparatus 200a, and so forth.

In one scenario consistent with this example, apparatus 200a may launch process 800, sending to process 700 of apparatus 200b first descriptive information 610 that matches item 1022 but not items 1020, 1021, 1023 and 1024. In case process 700 of apparatus 200b finds that no item matches first descriptive information 610, for example due to difference in appearance of item 1022 due to a difference in capturing parameters between apparatuses 200a and 200b, process 700 of apparatus 200b may send a no identification indication 640 to no identification indication handling module 930 of apparatus 200a, and in response, no identification indication handling module 930 may request apparatus 200b to change its capturing parameters. In case process 700 of apparatus 200b finds that items 1022 and 1025 matches the first descriptive information 610, process 700 of apparatus 200b may generate and send second descriptive information 620 that differentiate between item 1022 and item 1025, which apparatus 200a may handle using second descriptive information handling module 910, by launching new process 700 in apparatus 200a, by determining if second descriptive information 620 matches item 1022 or not, and so forth. In case process 700 of apparatus 200b finds that only item 1022 matches the first descriptive information 610, process 700 of apparatus 200b may send a unique identification indication 630 to uniqueness indication handling module 920, and Step 760 and uniqueness indication handling module 920 may register the association of item 1022 and the first descriptive information 610.

It will also be understood that the system according to the invention may be a suitably programmed computer, the computer including at least a processing unit and a memory unit. For example, the computer program can be loaded onto the memory unit and can be executed by the processing unit. Likewise, the invention contemplates a computer program being readable by a computer for executing the method of the invention. The invention further contemplates a machine-readable memory tangibly embodying a program of instructions executable by the machine for executing the method of the invention.

What is claimed is:

1. A system for visual recognition, the system comprising:
   at least one communication device;
   at least one image sensor configured to capture image data; and
   at least one processing unit configured to:
      receive from an external device, using the at least one communication device, a first descriptive information;
      analyze the image data to identify a group of items matching the first descriptive information;
      determine that the identified group of items comprises at least two items; and
      based on the determination that the identified group of items comprises at least two items:
         generate a second descriptive information matching a first subset of the identified group of items, where at least one item of the identified group of items is not in the first subset;
         transmit to the external device, using the at least one communication device, the second descriptive information;
         generate a third descriptive information matching a second subset of the identified group of items, where at least one item of the identified group of items is not in the second subset, and where the first subset and the second subset are not identical; and
         transmit to the external device, using the at least one communication device, the third descriptive information.

2. The system of claim 1, wherein the at least one processing unit is further configured to:
   generate a proposed identification value associated with the first descriptive information; and
   transmit to the external device, using the at least one communication device, the proposed identification value.

3. The system of claim 1, wherein the at least one processing unit is further configured to receive from the external device, using the at least one communication device, a proposed identification value associated with the first descriptive information.

4. The system of claim 1, wherein the at least one processing unit is further configured to:
   obtain a proposed identification value associated with the first descriptive information;
   determine that the identified group of items is a group of a single item; and
   based on the determination that the identified group of items is a group of a single item, store in memory an association of the single item with the proposed identification value and the external device.

5. The system of claim 1, wherein the at least one processing unit is further configured to:
   determine that the identified group of items is a group of a single item; and
   based on the determination that the identified group of items is a group of a single item, transmit to the external device, using the at least one communication device, an indication that the identified group of items is a group of a single item.

6. The system of claim 1, wherein the at least one processing unit is further configured to:
   determine that the identified group of items is an empty group; and
   based on the determination that the identified group of items is an empty group, transmit to the external device, using the at least one communication device, an indication that the identified group of items is an empty group.

7. The system of claim 1, wherein the identified group of items is a group of objects, and wherein analyzing the image data to identify a group of items comprises analyzing the image data using an object detection algorithm.

8. The system of claim 1, wherein each of the first descriptive information and the second descriptive information comprises at least one of: shape information and color information.

9. The system of claim 1, wherein each of the first descriptive information and the second descriptive information comprises motion information.

10. The system of claim 1, wherein the at least one processing unit is further configured to receive from the external device, using the at least one communication device, spatial information; and wherein identifying the group of items matching the first descriptive information is based, at least in part, on the spatial information.

11. The system of claim 1, wherein the at least one processing unit is further configured to receive from the external device, using the at least one communication device, at least one capturing parameter of an image sensor used by the external device; and wherein identifying the group of items matching the first descriptive information is based, at least in part, on the at least one capturing parameter.

12. A method for visual recognition, the method comprising:
   receiving from an external device a first descriptive information;
   obtaining image data captured using at least one image sensor;
   analyzing the image data to identify a group of items matching the first descriptive information;
   determining that the identified group of items comprises at least two items; and
   based on the determination that the identified group of items comprises at least two items:
      generating a second descriptive information matching a first subset of the identified group of items, where at least one item of the identified group of items is not in the first subset;
      transmitting to the external device the second descriptive information;
      generating a third descriptive information matching a second subset of the identified group of items, where at least one item of the identified group of items is not in the second subset, and where the first subset and the second subset are not identical; and transmitting to the external device the third descriptive information.

13. The method of claim 12, further comprising:
generating a proposed identification value associated with the first descriptive information; and
transmitting to the external device the proposed identification value.

14. The method of claim 12, further comprising:
receiving from the external device a proposed identification value associated with the first descriptive information.

15. The method of claim 12, further comprising:
obtaining a proposed identification value associated with the first descriptive information;
determining that the identified group of items is a group of a single item; and
based on the determination that the identified group of items is a group of a single item, storing in memory an association of the single item with the proposed identification value and the external device.

16. The method of claim 12, further comprising:
determining that the identified group of items is a group of a single item; and
based on the determination that the identified group of items is a group of a single item, transmitting to the external device an indication that the identified group of items is a group of a single item.

17. The method of claim 12, further comprising:
determining that the identified group of items is an empty group; and
based on the determination that the identified group of items is an empty group, transmitting to the external device an indication that the identified group of items is an empty group.

18. The method of claim 12, wherein the identified group of items is a group of objects, and wherein analyzing the image data to identify a group of items comprises analyzing the image data using an object detection algorithm.

19. The method of claim 12, wherein each of the first descriptive information and the second descriptive information comprises at least one of: shape information and color information.

20. The method of claim 12, wherein each of the first descriptive information and the second descriptive information comprises motion information.

21. The method of claim 12, further comprising receiving spatial information from the external device; and wherein identifying the group of items matching the first descriptive information is based, at least in part, on the spatial information.

22. The method of claim 12, further comprising receiving at least one capturing parameter of an image sensor used by the external device; and wherein identifying the group of items matching the first descriptive information is based, at least in part, on the at least one capturing parameter.

23. A non-transitory computer readable medium storing a software program comprising data and computer implementable instructions for carrying out a method, the method comprising:
receiving from an external device a first descriptive information;
obtaining image data captured using at least one image sensor;
analyzing the image data to identify a group of items matching the first descriptive information:
determining that the identified group of items comprises at least two items; and
based on the determination that the identified group of items comprises at least two items:
generating a second descriptive information matching a first subset of the identified group of items, where at least one item of the identified group of items is not in the first subset;
transmitting to the external device the second descriptive information;
generating a third descriptive information matching a second subset of the identified group of items, where at least one item of the identified group of items is not in the second subset, and where the first subset and the second subset are not identical; and
transmitting to the external device the third descriptive information.

* * * * *